US012802433B2

(12) United States Patent
Chen et al.

(10) Patent No.: US 12,802,433 B2
(45) Date of Patent: Nov. 17, 2026

(54) INFORMATION PROCESSING APPARATUS, PROCESSING METHOD, AND NON-TRANSITORY COMPUTER-READABLE STORAGE MEDIUM STORING COMPUTER PROGRAM

(71) Applicant: CANON KABUSHIKI KAISHA, Tokyo (JP)

(72) Inventors: Tsewei Chen, Tokyo (JP); Masami Kato, Kanagawa (JP)

(73) Assignee: CANON KABUSHIKI KAISHA, Tokyo (JP)

(*) Notice: Subject to any disclaimer, the term of this patent is extended or adjusted under 35 U.S.C. 154(b) by 151 days.

(21) Appl. No.: 18/822,660

(22) Filed: Sep. 3, 2024

(65) Prior Publication Data

US 2025/0086960 A1 Mar. 13, 2025

(30) Foreign Application Priority Data

Sep. 7, 2023 (JP) ................................ 2023-145572

(51) Int. Cl.
*G06V 10/82* (2022.01)
*G06V 10/77* (2022.01)

(52) U.S. Cl.
CPC .......... *G06V 10/82* (2022.01); *G06V 10/7715* (2022.01)

(58) Field of Classification Search
CPC ... G06V 10/82; G06V 10/7715; G06V 10/454
See application file for complete search history.

(56) References Cited

U.S. PATENT DOCUMENTS

| | | | | |
|---|---|---|---|---|
| 10,210,419 | B2 | 2/2019 | Kato | |
| 10,268,881 | B2 | 4/2019 | Chen | |
| 10,380,753 | B1 * | 8/2019 | Csordás | G06N 3/045 |
| 11,574,188 | B2 | 2/2023 | Kato | |
| 11,900,577 | B2 | 2/2024 | Kato | |
| 2018/0338159 | A1 * | 11/2018 | Kapoor | G06N 3/02 |
| 2020/0293885 | A1 | 9/2020 | Kato | |
| 2021/0287070 | A1 | 9/2021 | Kato | |
| 2021/0390660 | A1 * | 12/2021 | Baek | G06N 3/045 |
| 2022/0012856 | A1 * | 1/2022 | Chen | G06F 17/153 |
| 2023/0153944 | A1 * | 5/2023 | Liu | G06N 3/045 345/428 |

FOREIGN PATENT DOCUMENTS

| | | | |
|---|---|---|---|
| JP | 4069300 | B2 | 4/2008 |

* cited by examiner

*Primary Examiner* — Jennifer Mehmood
*Assistant Examiner* — Vaisali Rao Koppolu
(74) *Attorney, Agent, or Firm* — Carter, DeLuca & Farrell LLP

(57) ABSTRACT

An information processing apparatus that processes feature data in a plurality of feature maps in accordance with a network structure including a plurality of layers, the information processing apparatus comprising: a data holding unit configured to hold feature data; a first reading unit configured to read the feature data based on a read pattern; an upscaling unit configured to upscale the read feature data; and a convolution processing unit configured to perform convolution processing on the feature data upscaled by the upscaling unit, wherein the upscaling unit and the convolution processing unit execute upscaling and convolution processing on the feature data in one feature map, and then execute upscaling and convolution processing on the feature data in the next feature map.

16 Claims, 16 Drawing Sheets

2ND LINE 1ST ITERATION

2ND LINE 2ND ITERATION

INFORMATION PROCESSING APPARATUS, PROCESSING METHOD, AND NON-TRANSITORY COMPUTER-READABLE STORAGE MEDIUM STORING COMPUTER PROGRAM

BACKGROUND OF THE INVENTION

Field of the Invention

The present invention relates to an information processing apparatus, a processing method, and a non-transitory computer-readable storage medium storing a computer program.

Description of the Related Art

Convolutional neural networks (CNN) are known as a technique used for deep learning. In CNNs, multiple layers are hierarchically connected. In CNNs, feature data in the form of images are calculated to generate feature maps including feature data in each layer from input images. In CNNs, multiple pixels (channels) of feature maps are processed in each layer. For example, there is a CNN in which there are four layers, and one or more channels of feature maps are in each layer. This CNN executes convolution processing using filter weights, which are filter coefficients that have been learned, and feature data allocated to feature-map pixels. Convolution processing is a multiply-accumulate operation, and includes multiple rounds of multiplication and cumulative addition.

Feature-map resolution needs to be increased by processing such as deconvolution in order to increase accuracy in cases such as when the positional accuracy of object detection results based on CNN output is important, accurate areas of target objects within images are to be detected, and a CNN is to be applied to image processing. Deconvolution processing can be divided into upscaling processing for increasing resolution and convolution processing. In upscaling processing in deconvolution processing, resolution is increased by outputting zero values. Japanese Patent No. 4069300 discloses an apparatus for upscaling images.

Image upscaling processing can be realized according to the technique disclosed in Japanese Patent No. 4069300; however, there is a problem that a line buffer for temporarily holding an image is necessary, the power necessary to access a memory increases in proportion to image size, and memory cost increases.

SUMMARY OF THE INVENTION

According to one aspect of the present disclosure, there is provided an information processing apparatus that processes feature data in a plurality of feature maps in accordance with a network structure including a plurality of layers, the information processing apparatus comprising: a data holding unit configured to hold feature data; a first reading unit configured to read the feature data based on a read pattern; an upscaling unit configured to upscale the read feature data; and a convolution processing unit configured to perform convolution processing on the feature data upscaled by the upscaling unit, wherein the upscaling unit and the convolution processing unit execute upscaling and convolution processing on the feature data in one feature map, and then execute upscaling and convolution processing on the feature data in the next feature map.

According to another aspect of the present disclosure, there is provided a processing method for an information processing apparatus that processes feature data in a plurality of feature maps in accordance with a network structure including a plurality of layers, the processing method comprising: holding feature data; reading the feature data based on a read pattern; upscaling the read feature data; and performing convolution processing on the feature data upscaled by the upscaling, wherein, in the upscaling of the feature data and the convolution processing, upscaling and convolution processing are executed on the feature data in one feature map, and then upscaling and convolution processing are executed on the feature data in the next feature map.

According to another aspect of the present disclosure, there is provided a non-transitory computer-readable storage medium storing a computer program that, by being read and executed by a computer that processes feature data in a plurality of feature maps in accordance with a network structure including a plurality of layers, causes the computer to: hold feature data; read the feature data based on a read pattern; upscale the read feature data; and perform convolution processing on the feature data upscaled by the upscaling, wherein, in the upscaling of the feature data and the convolution processing, the computer is caused to execute upscaling and convolution processing on the feature data in one feature map, and then execute upscaling and convolution processing on the feature data in the next feature map.

Further features of the present invention will become apparent from the following description of exemplary embodiments (with reference to the attached drawings).

DESCRIPTION OF THE EMBODIMENTS

Figure 1:
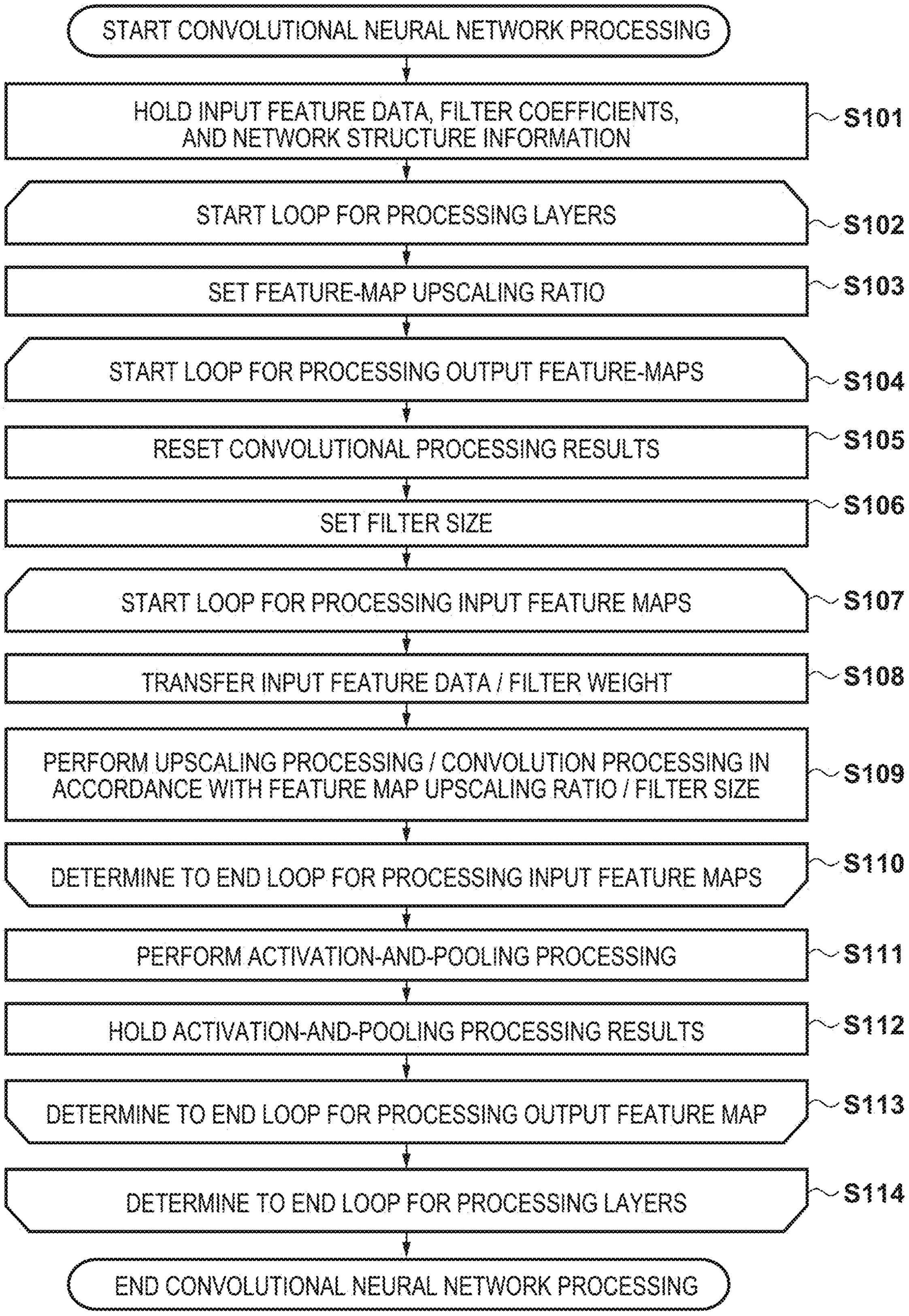
FIG. 1 is a flowchart of convolutional neural network processing in a first embodiment.

Hereinafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate. Furthermore, in the attached drawings, the same reference numerals are given to the same or similar configurations, and redundant description thereof is omitted.

First Embodiment

In the following, an embodiment of the present invention will be described in detail with reference to the drawings.

<Example Configuration of Convolution Processing Apparatus>

Figure 3:
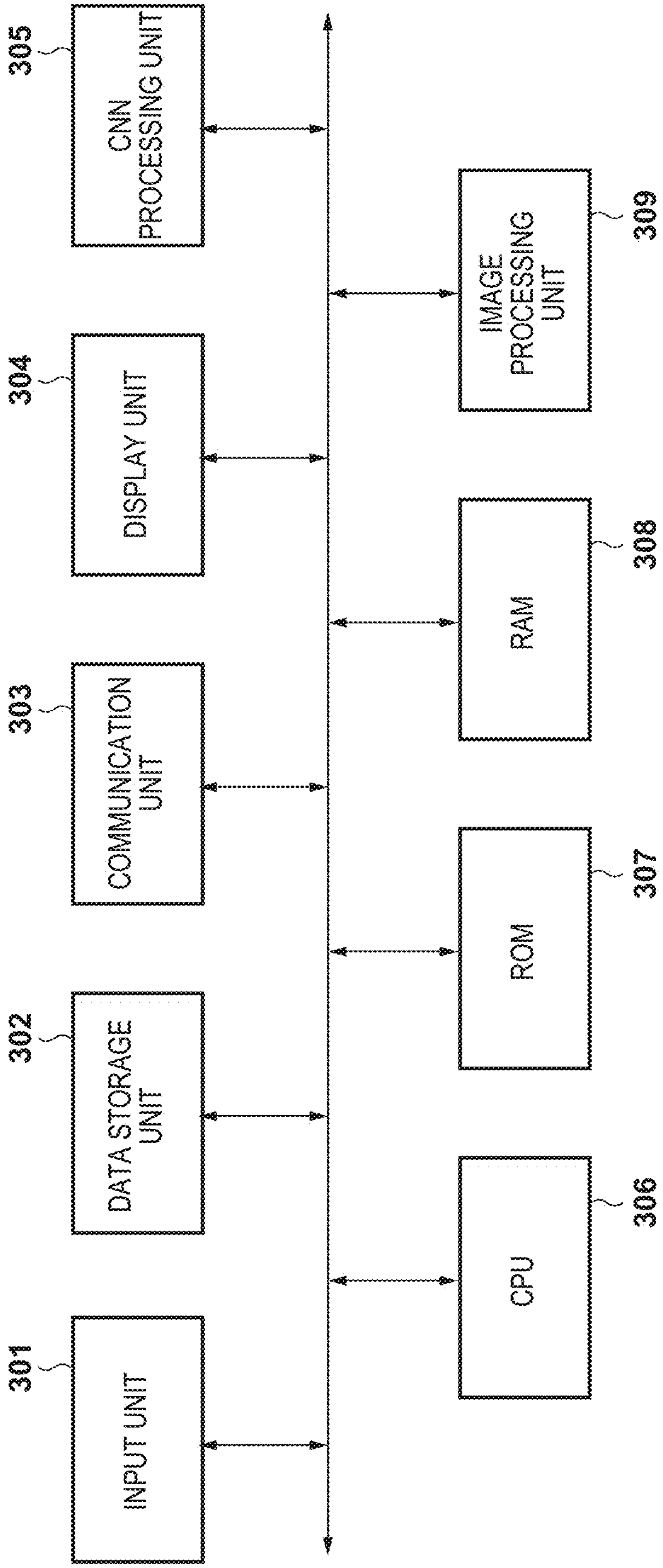
FIG. 3 is a block diagram illustrating an example configuration of a convolution processing apparatus in the first embodiment.

FIG. 3 is a block diagram illustrating an example configuration of a convolution processing apparatus according to the present invention. The convolution processing apparatus is an example of an information processing apparatus, and is a computer, for example. The convolution processing apparatus includes an input unit 301, a data storage unit 302, a communication unit 303, a display unit 304, a CNN processing unit 305, a CPU 306, a ROM 307, a RAM 308, and an image processing unit 309.

The input unit 301 is a device for inputting data and instructions from a user, and includes a keyboard, a pointing device, one or more buttons, etc.

The data storage unit 302 is a portion in which image data is stored, and is typically formed from a hard disk, solid-state drive (SSD), flexible disk, CD-ROM, CD-R, DVD, memory card, CF card, SmartMedia card, SD card, Memory Stick, xD-Picture card, USB memory, or the like. Programs and other types of data can also be stored in the data storage unit 302 besides image data. Alternatively, part of the later-described RAM 308 may be used as the data storage unit 302. Alternatively, the data storage unit 302 may be virtually constructed such that a storage device of an apparatus with which connection is established via the later-described communication unit 303 is used via the communication unit 303.

The display unit 304 is a device that displays images before and after image processing or images such as GUIs, and a CRT, a liquid-crystal display, or the like is typically used. Alternatively, the display unit 304 may be an external display device that is connected via a cable or the like. Alternatively, the display unit 304 and the input unit 301 may be formed from the same single device such as a known touchscreen device. In this case, input via the touchscreen is processed as input to the input unit 301.

The CPU 306 is an arithmetic processing device that executes programs, and controls the overall operation of the present apparatus. The ROM 307 and the RAM 308 provide the CPU 306 with programs, data, a working area, etc., that are necessary for the processing. In a case in which a program necessary for the later-described processing is stored in the data storage unit 302 or the ROM 307, the program is executed after being temporarily loaded to the RAM 308. Furthermore, in a case in which the convolution processing apparatus receives the program via the communication unit 303, the program is executed by being loaded to the RAM 308 after being temporarily recorded to the data storage unit 302, or after being directly loaded to the RAM 308 from the communication unit 303. Note that, while a configuration in which there is one CPU 306 is illustrated in FIG. 3, the CPU 306 may be provided in a plurality. Furthermore, the convolution processing apparatus may include, in addition to the CPU 306, one or more arithmetic processing devices such as a graphics processing unit (GPU), a micro processing unit (MPU), a neural processing unit (NPU), and/or a quantum processing unit (QPU).

Upon receiving a command from the CPU 306, the image processing unit 309 reads image data written to the data storage unit 302, adjusts the range of pixel values in the image data, and writes back the adjusted image data to the RAM 308. The image processing unit 309 may be realized using an arithmetic processing device such as a GPU or another CPU, for example.

In accordance with the later-described flowchart in FIG. 1, the CNN processing unit 305 uses the result of image processing stored in the RAM 308 and performs convolutional neural network processing (steps S101 to S114) including a multiply-accumulate operation, and outputs the processing result to the data storage unit 302 (or the RAM 308). The CNN processing unit 305 may be realized using an arithmetic processing device such as a GPU or another CPU.

The CPU 306 executes image processing or image recognition in a moving image (when there are multiple frames) based on the result of the convolutional neural network processing. The CPU 306 stores the processing result of the image processing or image recognition to the RAM 308.

The communication unit 303 is an interface for inter-device communication. Note that, while a diagram in which the input unit 301, the data storage unit 302, and the display unit 304 are all included in a single apparatus is illustrated in FIG. 3, such a configuration may be formed as a whole by some of these components being connected via a communication path based on a known communication method.

While various components other than those described above are present in the system configuration of the apparatus, such components are not key aspects of the present invention and description thereof is thus omitted.

<Processing-Target Network>

Figure 2:
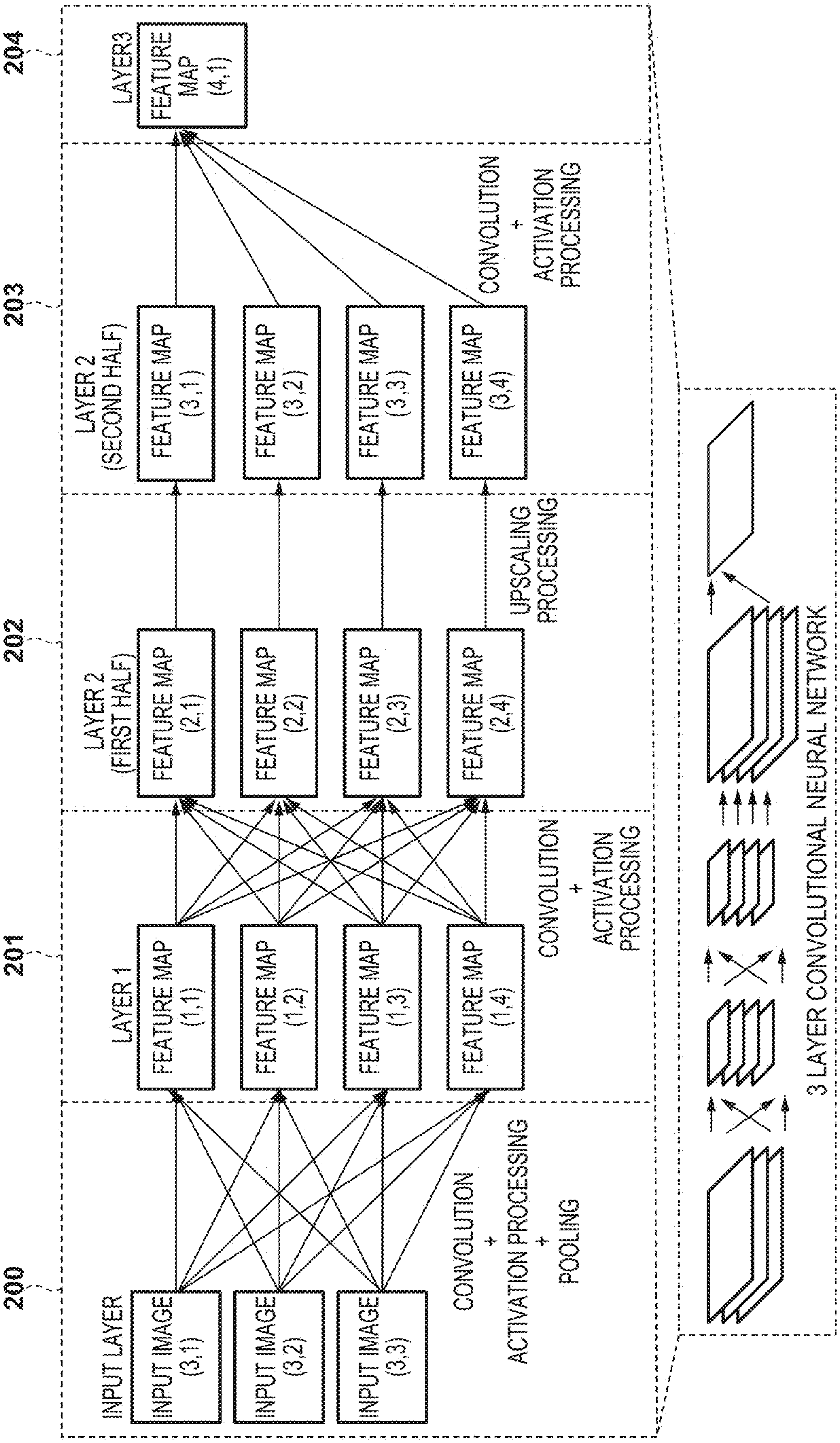
FIG. 2 illustrates an example of a structure of a convolutional network in the first embodiment.

FIG. 2 illustrates an example of a structure of a convolutional neural network executed by the CNN processing unit 305. By executing the convolutional neural network, the CNN processing unit 305 outputs a feature map 204 as a confidence map indicating the certainty of area(s) and position(s) of one or more detection-target objects in input images. The network structure includes information about each layer (such as inter-layer connection relationship, filter structure, filter size, filter-weight bit width, and size, bit width, and number of feature maps). The number of layers in this network is four (an input layer and layers 1 to 3), and there are multiple feature maps in each layer. One feature map includes multiple pixels of feature data. The multiple input images and feature maps correspond to multiple channels. There are three input images, and the input images are composed of the three channels red (R), green (G), and blue (B). A hierarchical configuration is adopted for filters and multiple feature data.

Feature maps in a current layer are calculated using feature maps in a previous layer and filter weights corresponding to the previous layer. Information about the multiple feature maps in the previous layer is necessary to calculate one feature map in the current layer. Formula 1 is a calculation formula of convolution processing for generating a feature map.

[Math. 1]

$$O_{i,j}(n) = \sum_{m=1}^{M}\sum_{x=0}^{X-1}\sum_{y=0}^{Y-1}\left(I_{i-\frac{X-1}{2}+x,\,j-\frac{Y-1}{2}+y}(m) \times C_{x,y}(m, n)\right) \quad \text{(Formula 1)}$$

The variable n is a number indicating a feature map in the current layer, and the variable m is a number indicating a feature map in the previous layer. There are M feature maps in the previous layer, and I(m) indicates the mth feature map. There are X×Y filter weights ($C_{0,0}$(m,n) to $C_{X-1,Y-1}$(m,n)), and these filter weights differ for each feature map. In this example, the variables X and Y are odd numbers, and the number of times a multiply-accumulate operation is performed to calculate feature data in the current layer is M×X×Y times. $O_{i,j}$(n) indicates a convolution processing result of a pixel of feature data, and O(n) indicates a convolution processing result of an entire feature map in which multiple pixels of $O_{i,j}$(n) are included. The variables i and j indicate coordinates of feature data. After executing convolution processing, the CNN processing unit 305 calculates a feature map in the current layer by performing processing such as pooling and activation processing based on the network structure using the convolution processing results $O_{i,j}$(n).

The calculation in each layer will be described. In the input layer, the CNN processing unit 305 generates the multiple feature maps 201 in layer 1 by calculating convolution processing-, activation processing-, and pooling processing-results based on Formula 1 using three input images 200 and filter weights. In layer 1, the CNN processing unit 305 generates the multiple feature maps 202 in layer 2 by calculating convolution processing- and activation processing-results based on Formula 1 using the multiple feature maps 201 and filter weights. In the first half of layer 2, the CNN processing unit 305 generates the multiple feature maps 203 in the second half of layer 2 by upscaling the multiple feature maps 202 in the spatial direction. In the embodiment, upscaling represents the operation to increase the resolution of feature maps. An example $I'_{i,j}$(m) of an upscaled feature map can be represented by the following formula.

[Math. 2]

$$I'_{i,j}(m) = \begin{cases} I_{\frac{i}{R},\frac{j}{R}}(m), & \text{if } \left\lfloor \frac{i}{R} \right\rfloor \times R = i,\ \left\lfloor \frac{j}{R} \right\rfloor \times R = j \\ 0, & \text{otherwise} \end{cases} \quad \text{(Formula 2)}$$

[Math. 3]

$$\lfloor \bullet \rfloor \quad \text{(Floor Function)}$$

The variable R is a feature-map upscaling ratio. • is a floor function, and outputs the largest integer no greater than the input value shown as •. If the upscaling ratio R is 1, $(1-1/R^2)$ equals zero for the entire feature map, in which case feature data is not upscaled and the output becomes the same as the input. Upscaling processing may be substituted with interpolation processing commonly used for upsampling.

In the second half of layer 2, the CNN processing unit 305 generates the single feature map 204 in layer 3 by calculating convolution processing- and activation processing-results based on Formula 1 using the multiple feature maps 203 and filter weights. The feature map 204 is a confidence map outputted by the network. The processing in the first half of layer 2 and the processing in the second half of layer 2 are integrated, and upscaling processing in the first half and convolution processing in the second half are performed in the same layer. The processing in layer 2 in a case in which the feature maps 202 are upscaled based on Formula 2 corresponds to deconvolution processing and activation processing.

Figure 6:
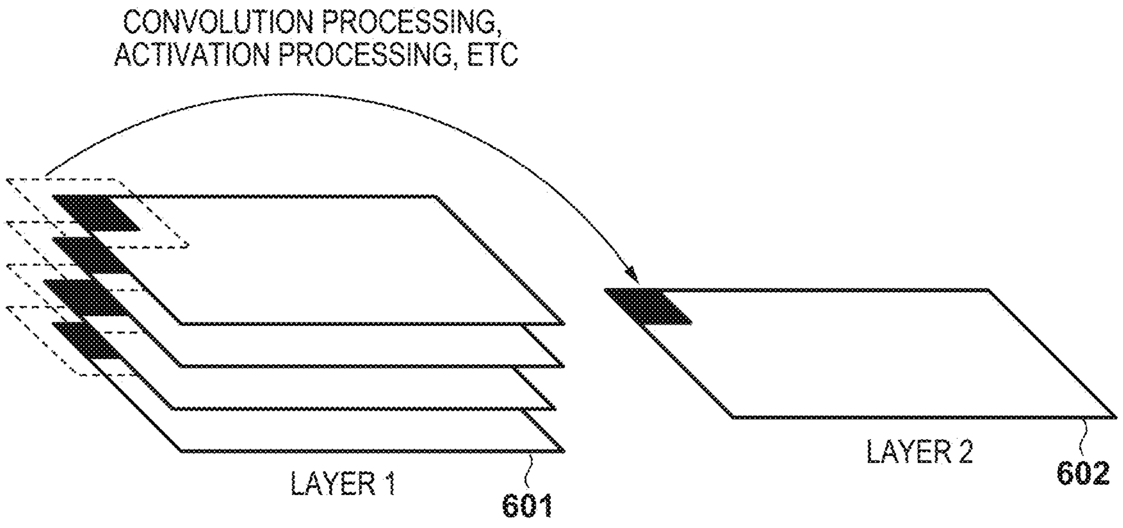
FIG. 6 illustrates an example showing a relationship between a network and convolution processing in the first embodiment.

FIG. 6 illustrates an example of a network and convolution processing. The CNN processing unit 305 extracts feature data from the same position in four feature maps 601 in layer 1 to perform convolution processing and calculate an activation processing result. The result thereof, i.e., a feature in layer 2 at the same position as that in layer 1, becomes feature data in an image 602.

<Flowchart of Convolutional Neural Network Processing in Present Embodiment>

Figure 4:
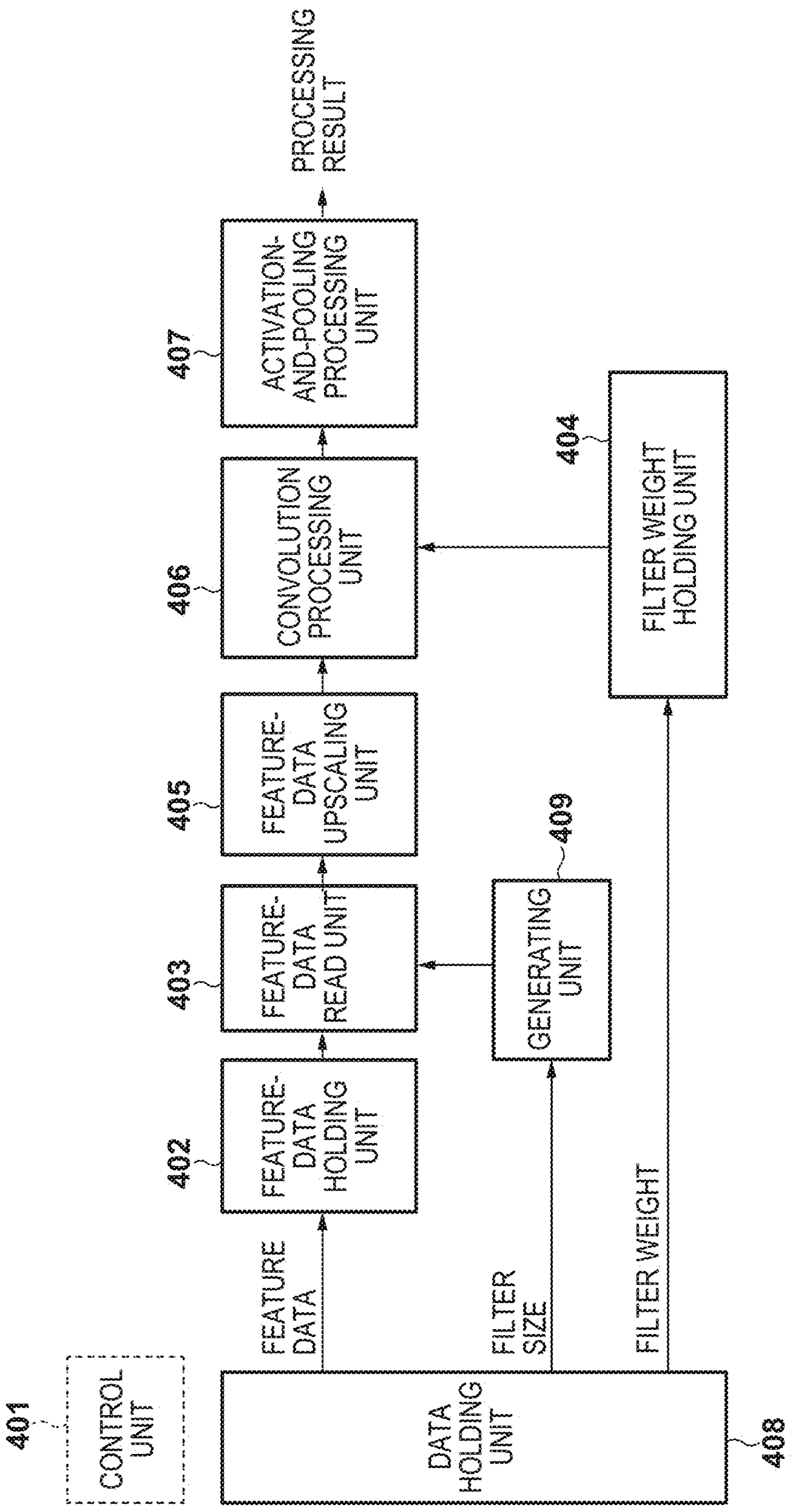
FIG. 4 is a block diagram of a CNN processing unit in the first embodiment.

FIG. 4 illustrates a configuration of the CNN processing unit 305. The CNN processing unit 305 includes a data holding unit 408, a control unit 401, a feature-data holding unit 402, a filter-weight holding unit 404, a feature-data reading unit 403, a feature-data upscaling unit 405, a convolution processing unit 406, an activation-and-pooling processing unit 407, and a generating unit 409.

The data holding unit 408 temporarily holds feature data of multiple input images and feature maps, filter weights, and network structure information. The filter-weight holding unit 404 holds filter weights $C_{x,y}$(m,n). The feature-data holding unit 402 holds feature maps I(m). The feature-data reading unit 403 reads feature data from the feature-data holding unit 402.

Based on the network structure, the generating unit 409 generates a read pattern for reading feature data from the data holding unit 408. Specifically, the generating unit 409 generates a read pattern by acquiring, from the data holding unit 408, an upscaling ratio, filter size, processing line, etc., relating to the network structure. For example, the generating unit 409 may generate a read pattern based on the filter size of the convolution processing unit 406 in each layer. Thus, the generating unit 409 can generate a read pattern corresponding to the number of pixels of feature data to be inputted to the convolution processing unit 406.

The feature-data upscaling unit 405 upscales feature data read from the data holding unit 408 based on a read pattern, and outputs the upscaled feature data to the convolution processing unit 406. Here, the feature-data upscaling unit 405 does not collectively upscale all feature data in a feature map of one channel; rather, the feature-data upscaling unit 405 sequentially upscales a subset of feature data that is necessary for convolution processing and outputs the upscaled subset of feature data to the convolution processing unit 406.

The convolution processing unit 406 calculates convolution processing results from filter weights and feature data based on Formula 1. Here, the convolution processing unit 406 does not acquire all feature data in a feature map of one channel after the feature data has been upscaled; rather, the convolution processing unit 406 acquires an upscaled subset of feature data in a feature map from the feature-data upscaling unit 405, and sequentially executes convolution processing. The convolution processing unit 406 can execute convolution processing on a subset of feature data in a feature map in such a manner. Thus, differing from conventional technology, the feature-data upscaling unit 405 and the convolution processing unit 406 do not need to write back upscaled feature data to a memory and then read the upscaled feature data from a memory once again to perform convolution processing. Because upscaling processing and convolution processing are integrated according to the layer fusion method, the feature-data upscaling unit 405 and the convolution processing unit 406 continuously execute upscaling processing and convolution processing in the same layer. In other words, the feature-data upscaling unit 405 and the convolution processing unit 406 execute upscaling and convolution processing on feature data in one feature map, and then execute upscaling and convolution processing on feature data in the next feature map. Because upscaled feature data is sequentially subjected to convolution processing in such a manner, the memory capacity necessary for storing upscaled feature data can be reduced, and the necessity of storing upscaled feature data to a memory can be alleviated. Thus, by reducing the number of times upscaled feature data is read from a memory, the convolution processing unit 406 can reduce power necessary to access a memory and reduce memory cost.

The activation-and-pooling processing unit 407 calculates activation and pooling processing results based on convolution processing results.

The control unit 401 includes a CPU, a GPU, a sequencer, or the like, and executes the processing in each of steps S101 to S114. The steps in the flowchart illustrated in FIG. 1 executed by the control unit 401 will be described based on the configuration of the CNN processing unit 305 illustrated in FIG. 4. For example, the control unit 401 may realize the functions of the CNN processing unit 305 illustrated in FIG. 4 by reading a program.

In step S101, the control unit 401 reads feature data of multiple input feature maps, filter weights, and network structure information from the RAM 308, and holds the read information in the data holding unit 408.

In step S102, the control unit 401 begins a loop for processing layers, and processes layer 1, which is the first layer. Thus, layer 1 is the processing-target layer when the loop begins.

In step S103, the control unit 401 sets a feature-map upscaling ratio R in accordance with the network structure information held in the data holding unit 408. The feature-map upscaling ratio R is a positive integer greater than or equal to 1. The value 1 is set in a case in which feature maps are not to be upscaled.

In step S104, the control unit 401 begins a loop for processing output feature maps, and sequentially calculates output feature data.

In step S105, the control unit 401 resets convolution processing results held in the convolution processing unit 406 by initializing the convolution processing results with zero values.

In step S106, the control unit 401 sets a filter size to the generating unit 409. The generating unit 409 generates a read pattern based on the upscaling ratio, the filter size, the processing line, etc. The read pattern indicates the addresses, the number, etc., of feature data to be read from the feature-data holding unit 402. The read pattern differs depending on the upscaling ratio, the filter size, the processing line, etc. There may be a means for storing read patterns inside the generating unit 409, and the generating unit 409 may refer to the read patterns stored therein in advance in accordance with the upscaling ratio, the filter size, the processing line, etc.

In step S107, the control unit 401 begins a loop for processing input feature maps, and sequentially processes input feature data. If there are multiple feature maps, i.e., if there are feature maps of multiple channels, the control unit 401 performs processing in the order of channels.

In step S108, the control unit 401 reads a subset of input feature maps from the data holding unit 408, and transfers the read subset of input feature maps to the feature-data holding unit 402. Then, the control unit 401 reads a subset of filter weights from the data holding unit 408, and transfers the read subset of filter weights to the filter-weight holding unit 404.

In step S109, the feature-data upscaling unit 405 receives a control signal from the control unit 401, and performs upscaling processing based on Formula 2 in accordance with the feature-map upscaling ratio R. If the feature-map upscaling ratio R is greater than 1, zero values are set to a subset of feature data. The feature-data reading unit 403 refers to the read pattern generated by the generating unit 409, and reads feature data from the feature-data holding unit 402. The feature-data upscaling unit 405 upscales the read feature data. The convolution processing unit 406 receives a control signal from the control unit 401, and calculates a convolution processing result using Formula 1 based on filter weights and input feature data that has been upscaled in accordance with the filter size.

FIGS. 7A to 7D illustrate an example of upscaling processing and convolution processing. The feature-map upscaling ratio R is 2, and the filter size is 3×3. Upscaling processing is divided into multiple iterations.

Figure 7A:
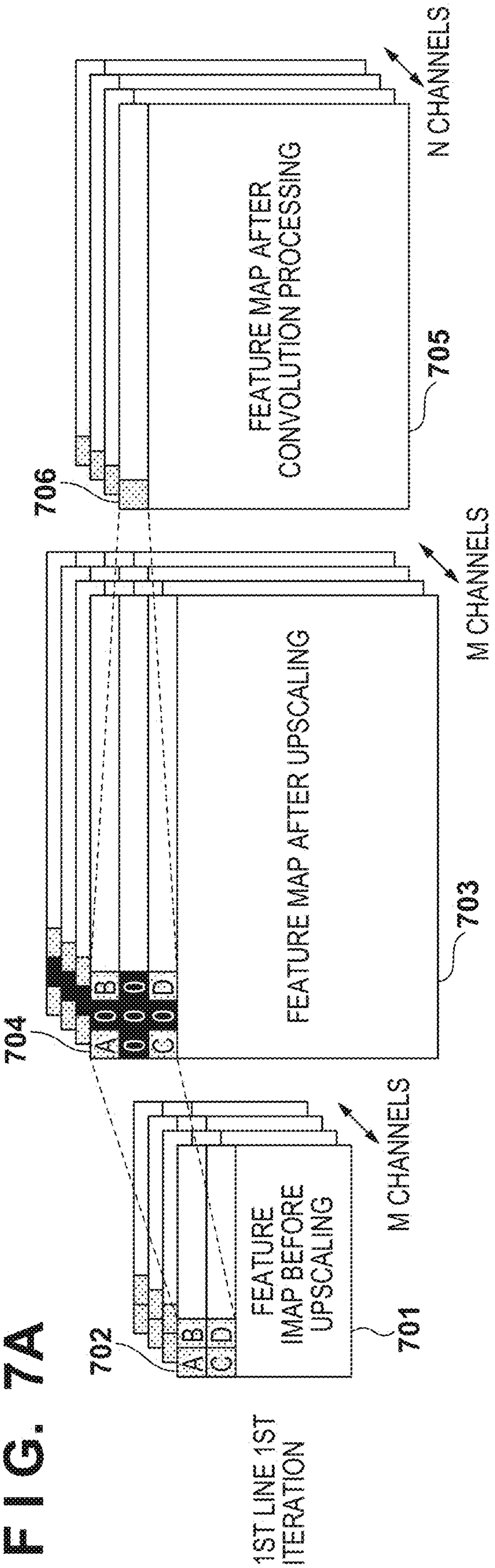
FIG. 7A illustrates an example of upscaling processing and convolution processing (filter size=3×3; upscaling ratio R=2; first iteration for line 1) in the first embodiment.

As illustrated in FIG. 7A, in the first iteration of processing for line 1 in the output feature map, the feature-data reading unit 403 reads 4 pixels of feature data 702 based on a read pattern from the feature map 701 before upscaling and the feature-data upscaling unit 405 inserts 5 pixels of feature data having zero values, and thereby generates 3×3 pixels of feature data 704 in the upscaled feature map 703 that correspond to the feature data 702. The convolution processing unit 406 locally calculates the convolution processing result 706 in the feature map 705 after convolution processing using the 3×3 pixels of feature data 704 and filter weights.

Figure 7B:
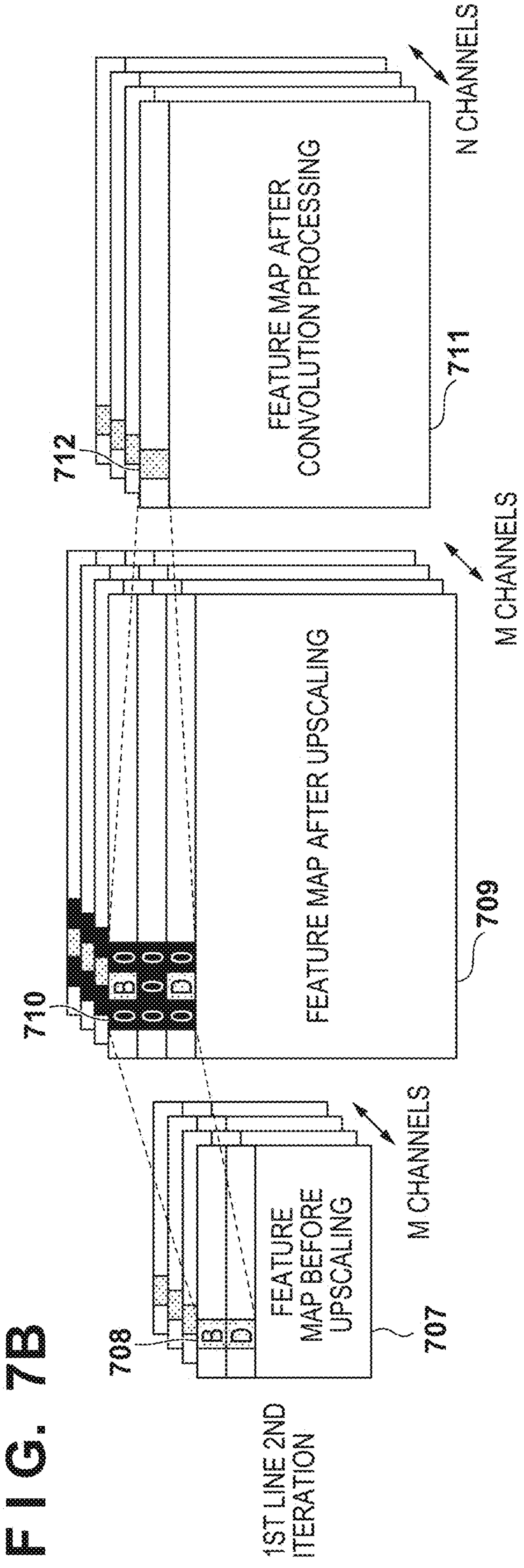
FIG. 7B illustrates an example of upscaling processing and convolution processing (filter size=3×3; upscaling ratio R=2; second iteration for line 1) in the first embodiment.

As illustrated in FIG. 7B, in the second iteration of processing for line 1 in the output feature map, the feature-data upscaling unit 405 reads 2 pixels of feature data 708 based on a read pattern from the feature map 707 before upscaling and inserts 7 pixels of feature data having zero values, and thereby generates 3×3 pixels of feature data 710 in the upscaled feature map 709 that correspond to the feature data 708. The number of pixels of feature data that are read differs from that in the first iteration of processing. The convolution processing unit 406 locally calculates the convolution processing result 712 in the feature map 711 after convolution processing using the 3×3 pixels of feature data and filter weights.

In the third and subsequent iterations of processing for line 1 in the output feature map, the read pattern in the first or second iteration is used, and thus detailed description thereof is omitted.

Figure 7C:
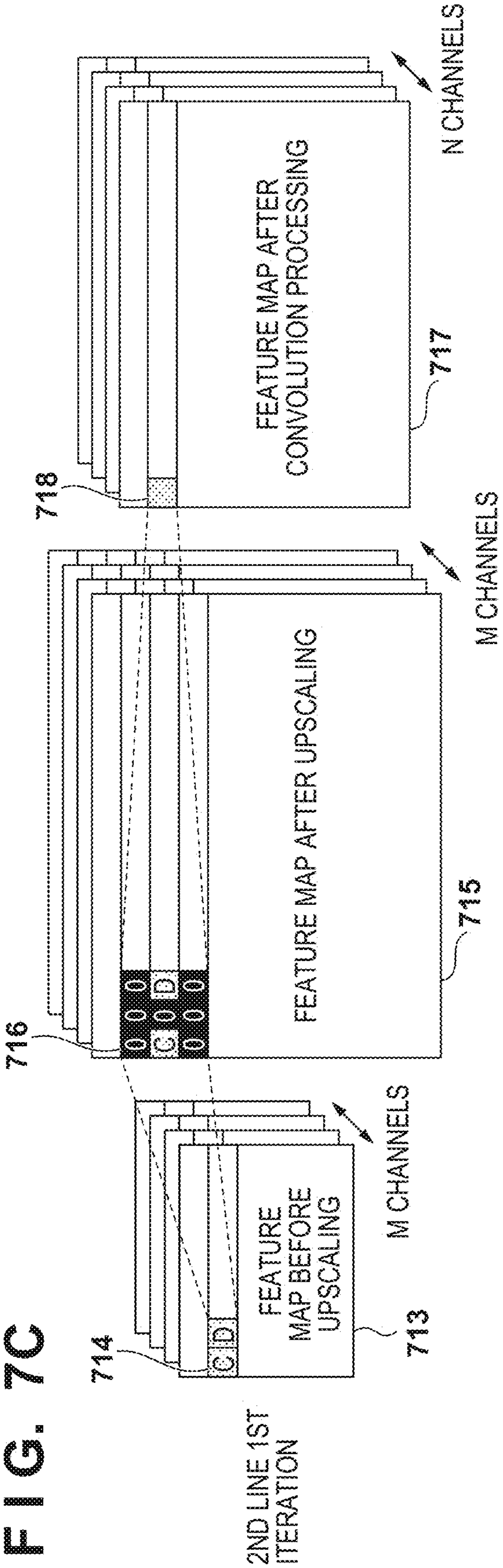
FIG. 7C illustrates an example of upscaling processing and convolution processing (filter size=3×3; upscaling ratio R=2; first iteration for line 2) in the first embodiment.

As illustrated in FIG. 7C, in the first iteration of processing for line 2 in the output feature map, the feature-data upscaling unit 405 reads 2 pixels of feature data 714 based on a read pattern from the feature map 713 before upscaling and inserts 7 pixels of feature data having zero values, and thereby generates 3×3 pixels of feature data 716 in the upscaled feature map 715. The convolution processing unit 406 locally calculates the convolution processing result 718 in the feature map 717 after convolution processing using the 3×3 pixels of feature data 716 and filter weights.

Figure 7D:
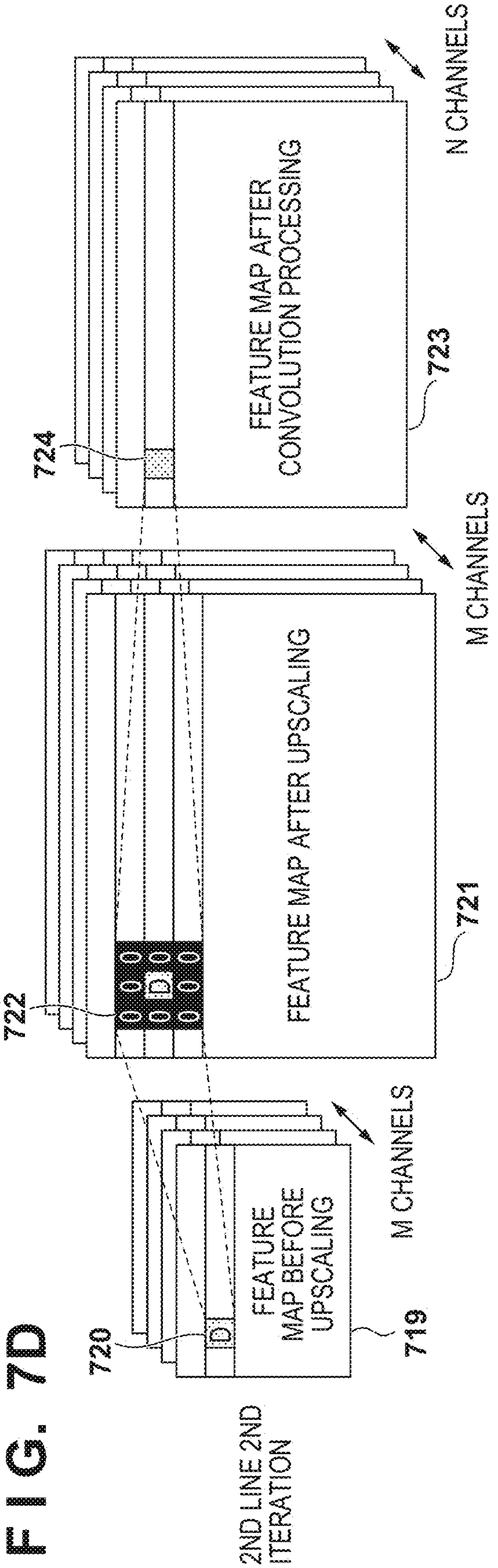
FIG. 7D illustrates an example of upscaling processing and convolution processing (filter size=3×3; upscaling ratio R=2; second iteration for line 2) in the first embodiment.

As illustrated in FIG. 7D, in the second iteration of processing for line 2 in the output feature map, the feature-data upscaling unit 405 reads 1 pixel of feature data 720 based on a read pattern from the feature map 719 before upscaling and inserts 8 pixels of feature data having zero values, and thereby generates 3×3 pixels of feature data 722 in the upscaled feature map 721. The number of pixels of feature data that are read differs from that in the first iteration of processing. The convolution processing unit 406 locally calculates the convolution processing result 724 in the feature map 723 after convolution processing using the 3×3 pixels of feature data 722 and filter weights.

In the third and subsequent iterations of processing for line 2 in the output feature map, the read pattern in the first or second iteration is used, and thus detailed description thereof is omitted.

There are four types of read patterns in total, which respectively include 4 pixels of feature data 702, 2 pixels of feature data 708, 2 pixels of feature data 714, and 1 pixel of feature data 720. The number of pixels of feature data that are read from the feature map before upscaling differs depending on read pattern.

In the present embodiment, because upscaling processing and convolution processing of a feature map are performed in the same layer, the feature-data upscaling unit 405 can directly input upscaled feature data to the convolution processing unit 406. Specifically, the feature-data upscaling unit 405 executes upscaling processing on a subset of feature data in a feature map, and outputs the upscaled feature data to the convolution processing unit 406. The convolution processing unit 406 executes convolution processing on feature data sequentially acquired from the feature-data upscaling unit 405. The feature-data upscaling unit 405 and the convolution processing unit 406 repeatedly execute upscaling and convolution processing on feature data in one feature map, and execute upscaling and convolution processing on feature data in the next feature map after upscaling and convolution processing of the feature data in the feature map is complete. Thus, the feature-data upscaling unit 405 does not need to temporarily hold, in a memory such as the data holding unit 408, the feature data (704, 710, 716, 722) in the upscaled feature map (703, 709, 715, 721), and thus the power necessary for the convolution processing unit 406 to access the memory can be reduced, and memory cost can be reduced. Furthermore, if the feature-map upscaling ratio R is 1, feature data read from the data holding unit 408 can be processed by the convolution processing unit 406 without upscaling the feature data.

Because the feature-data upscaling unit 405 outputs processed feature-map feature data to the convolution processing unit 406, the convolution processing unit 406 executes convolution processing regardless of the feature-map upscaling ratio R, i.e., regardless of whether the feature map is upscaled or not; therefore, there is no need to provide multiple convolution processing units 406 in accordance with upscaling ratios R, and circuit scale can thus be reduced.

Figure 8:
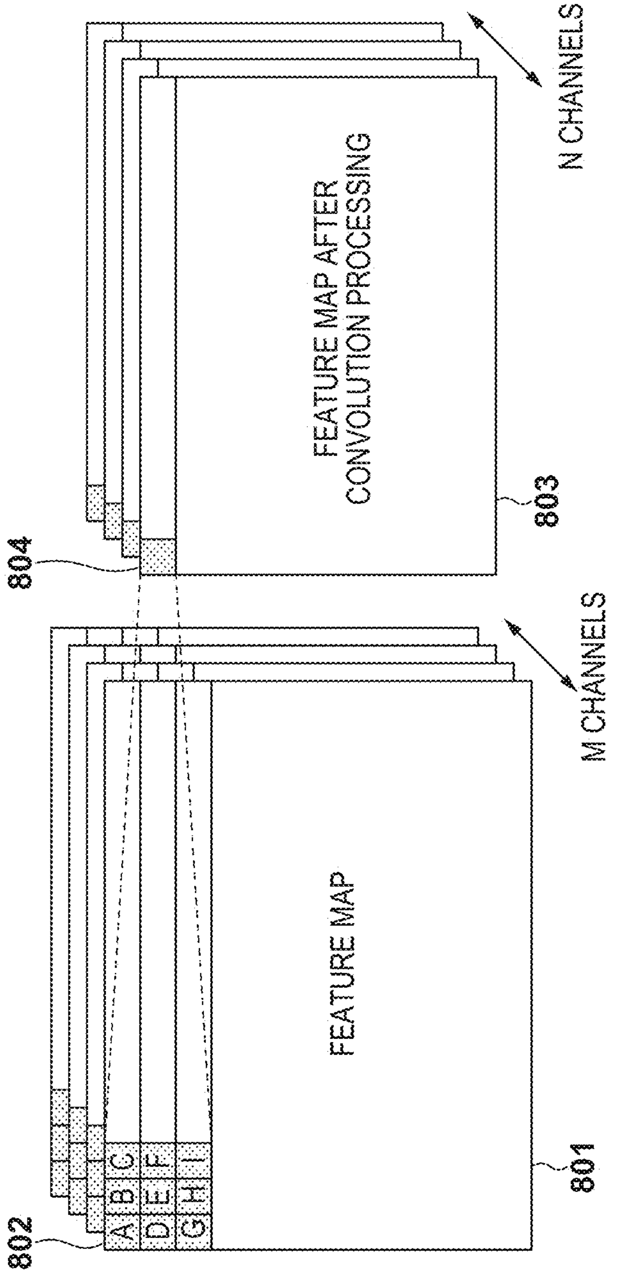
FIG. 8 illustrates an example of upscaling processing and convolution processing (filter size=3×3; upscaling ratio R=1) in the first embodiment.

FIG. 8 illustrates an example of upscaling processing and convolution processing. The feature-map upscaling ratio R is 1, and the processing is equivalent to that when upscaling is not performed. The filter size is 3×3. While upscaling processing is divided into multiple iterations, the same read pattern is used in every iteration. In the first iteration of processing for line 1 of the output feature map, 9 pixels of feature data 802 are read from the feature map 801 before upscaling. The upscaled feature data equals the feature data before upscaling. More pixels of feature data are read from the feature map before upscaling compared to the example in which the feature-map upscaling ratio R is 2. The convolution processing unit 406 calculates the convolution processing result 804 as part of the feature map 803 after convolution processing for part of the feature map 801 using the 3×3 pixels of feature data and filter weights.

In step S110, the control unit 401 determines the completion of the input feature map processing loop. If processing of all input feature maps is complete, processing advances to step S111. If the processing in steps S108 and S109 is not complete for all input feature maps, processing returns to step S107, and processing of the next input feature map begins.

In step S111, the activation-and-pooling processing unit 407 receives a control signal from the control unit 401, and performs activation processing based on the convolution processing results stored in the convolution processing unit 406. Activation processing results are calculated using the following formula.

[Math. 4]

$$f(x) = \begin{cases} 0, & x < 0 \\ x, & x \geq 0 \end{cases} \quad \text{(Formula 3)}$$

f(•) indicates an activation function, and x indicates input data. While the activation function is realized using a rectified linear unit (ReLU) in this example, there is no limitation to ReLU; the activation function may be realized using another nonlinear function or a quantization function.

Furthermore, in accordance with information of the layer, the activation-and-pooling processing unit 407 performs pooling processing based on the activation processing results to adjust the size of the output feature map, as necessary.

In step S112, the control unit 401 holds the activation and pooling processing results in the feature-data holding unit 402, and uses the results as a feature map in the next layer.

In step S113, the control unit 401 determines the completion of the output feature map processing loop. If processing of all output feature maps is complete, processing advances to step S114. If this is not the case, processing returns to step S105, and processing of the next output feature map begins.

In step S114, the control unit 401 determines the completion of the layer processing loop. If processing of all layers is complete, the convolutional neural network processing is terminated. If this is not the case, processing returns to step S103, where the processing-target layer is changed and processing of the next layer begins.

In the present embodiment, upscaling processing and convolution processing of a feature map of one channel are performed in the input feature map processing loop (steps S107 to S110) before feature data in the next input feature map is read, upscaled, etc. Thus, there is no need to perform feature-data upscaling processing and hold the upscaled feature map in a memory such as a line buffer each time feature data of an input feature map is read. Thus, the present embodiment can reduce the power necessary to access a memory, and reduce memory cost.

In the present embodiment, the feature-data upscaling unit 405 executes upscaling processing on a subset of feature data in a feature map, and outputs the feature data after upscaling processing to the convolution processing unit 406. Thus, in the present embodiment, the convolution processing unit 406 can sequentially execute convolution processing on subsets of feature data in a feature map.

In the present embodiment, the feature-data upscaling unit 405 executes upscaling processing on feature data in a feature map in accordance with the feature-map upscaling ratio R, and outputs the feature data to the convolution processing unit 406. Thus, the same convolution processing unit 406 can be used even if the upscaling ratio R varies. That is, there is no need to provide different convolution processing units 406 to process a layer in which the feature-map upscaling ratio R is 1 and a layer in which the feature-map upscaling ratio R is not 1, and the circuit scale of the convolution processing unit 406 can be reduced.

Second Embodiment

<Multiple Feature-Data Reading Units>

In the first embodiment, an example is described in which feature data is upscaled by the feature-data upscaling unit 405 in accordance with the feature-map upscaling ratio R; however, if the feature-map upscaling ratio R is 1, feature data does not need to be upscaled by the feature-data upscaling unit 405. In the second embodiment, configurations and steps differing from those in the first embodiment will be described.

Figure 5:
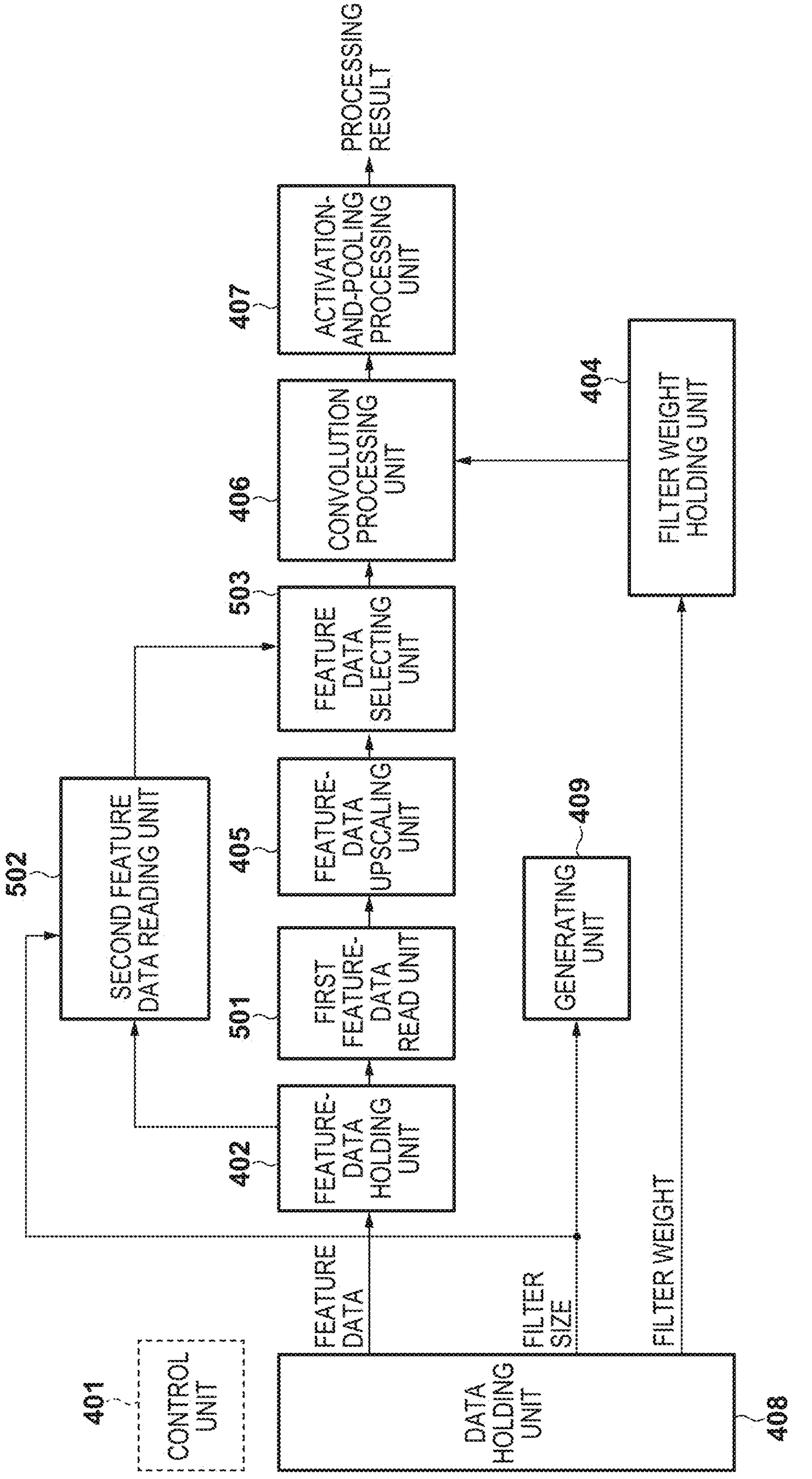
FIG. 5 is a block diagram of the CNN processing unit in a second embodiment.

FIG. 5 illustrates a configuration of the CNN processing unit 305. The CNN processing unit 305 includes the data holding unit 408, the control unit 401, the feature-data holding unit 402, the filter-weight holding unit 404, a first feature-data read unit 501, a second feature-data read unit 502, the feature-data upscaling unit 405, the convolution processing unit 406, the activation-and-pooling processing unit 407, the generating unit 409, and a feature-data selecting unit 503. The data holding unit 408 temporarily holds feature data of multiple input feature maps, filter weights, and network structure information. The filter-weight holding unit 404 holds filter weights $C_{x,y}(m,n)$. The feature-data holding unit 402 holds feature maps I(m). The convolution processing unit 406 calculates convolution processing results from filter weights and feature data based on Formula 1. The activation-and-pooling processing unit 407 calculates activation and pooling processing results based on convolution processing results.

In step S109 in the second embodiment, the feature-data upscaling unit 405 receives a control signal from the control unit 401, and performs upscaling processing in accordance with the feature-map upscaling ratio R. If the feature-map upscaling ratio R is not 1, the first feature-data read unit 501 reads feature data from the feature-data holding unit 402. The feature-data upscaling unit 405 upscales the feature data read by the first feature-data read unit 501, and outputs the upscaled feature data to the feature-data selecting unit 503. If the feature-map upscaling ratio R is 1, the second feature-data read unit 502 reads feature data from the feature-data holding unit 402, and outputs the feature data to the feature-data selecting unit 503 without upscaling the feature data. Here, if the filter size is the same, the number of pixels of feature data read by the first feature-data read unit 501 is less than the number of pixels of feature data read by the second feature-data read unit 502. Description will be provided based on an example in which the filter size is 3×3. If the upscaling ratio R is 2, the number of pixels of feature data read by the first feature-data read unit 501 is 1, 2, or 4, and the processing is the same as the processing in the first embodiment illustrated in FIG. 7. If the upscaling ratio R is 1, the number of pixels of feature data read by the second feature-data read unit 502 is 9. The processing is the same as the processing in the first embodiment illustrated in FIG. 8. The feature-data selecting unit 503 selects feature data acquired from either the feature-data upscaling unit 405 and the second feature-data read unit 502, and outputs the feature data to the convolution processing unit 406.

<Different Filter Size>

In the first embodiment, an example in which the feature-map upscaling ratio R is 2, and the filter size is 3×3 is described; however, the filter size is not limited to 3×3, and may be any appropriate size.

FIGS. 13A to 13D illustrate an example of upscaling processing and convolution processing. The feature-map upscaling ratio R is 2, and the filter size is 1×1. Upscaling processing is divided into multiple iterations.

Figure 13A:
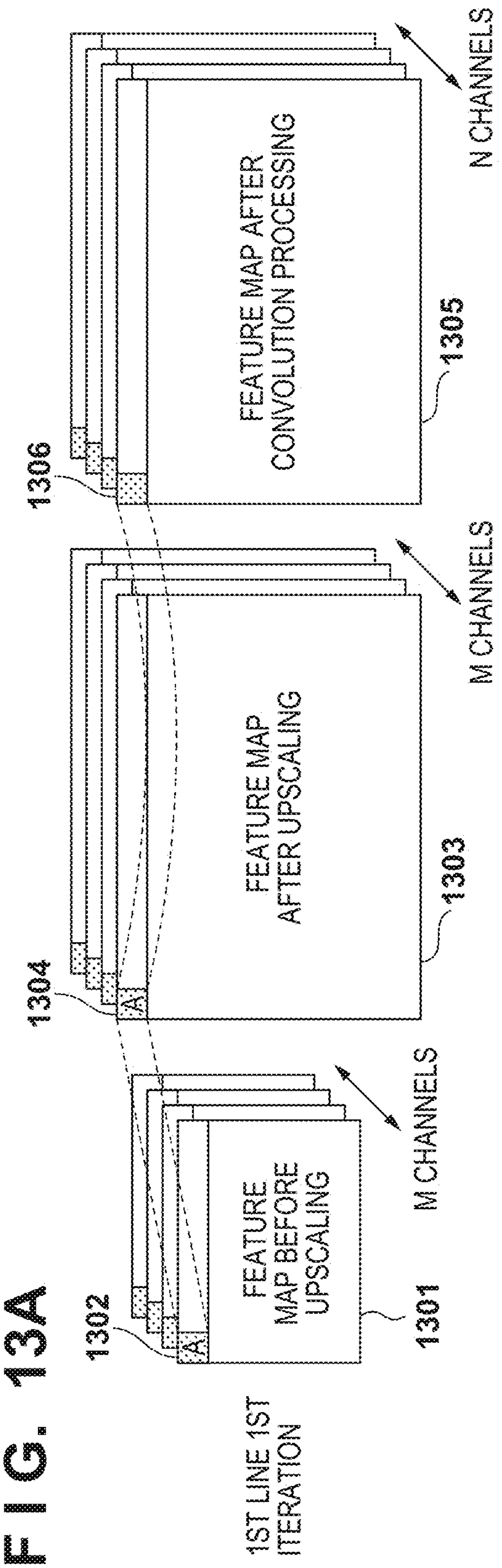
FIG. 13A illustrates an example of upscaling processing and convolution processing (filter size=1×1; upscaling ratio R=2; first iteration for line 1) in the second embodiment.

As illustrated in FIG. 13A, in the first iteration of processing for line 1 in the output feature map, the feature-data upscaling unit 405 reads 1 pixel of feature data 1302 based on a read pattern from the feature map 1301 before upscaling, and thereby generates 1×1 pixel of feature data 1304 in the upscaled feature map 1303. The convolution processing unit 406 locally calculates the convolution processing result 1306 in the feature map 1305 after convolution processing using the 1×1 pixel of feature data in the upscaled feature map 1303 and a filter weight.

Figure 13B:
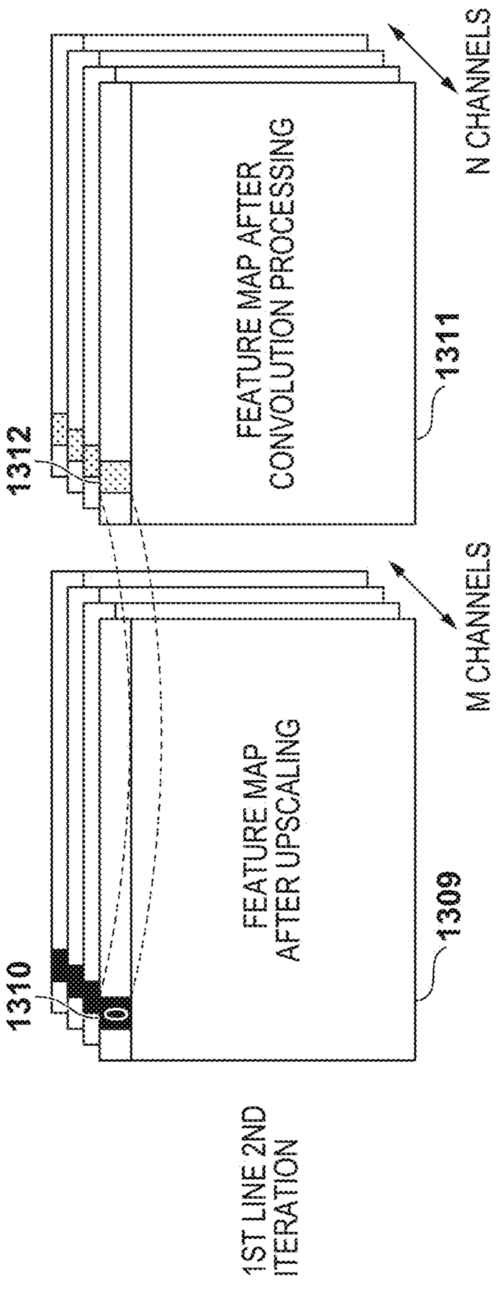
FIG. 13B illustrates an example of upscaling processing and convolution processing (filter size=1×1; upscaling ratio R=2; second iteration for line 1) in the second embodiment.

As illustrated in FIG. 13B, in the second iteration of processing for line 1 in the output feature map, the feature-data upscaling unit 405 does not need to read feature data based on a read pattern, and inserts 1 pixel of feature data having a zero value and thereby generates 1×1 pixel of feature data 1310 in the upscaled feature map 1309. The number of pixels of feature data that are read differs from that in the first iteration of processing. The convolution processing unit 406 locally calculates the convolution processing result 1312 in the feature map 1311 after convolution processing using the 1×1 pixel of feature data in the upscaled feature map 1309 and a filter weight.

In the third and subsequent iterations of processing for line 1 in the output feature map, the read pattern in the first or second iteration is used, and thus detailed description thereof is omitted.

Figure 13C:
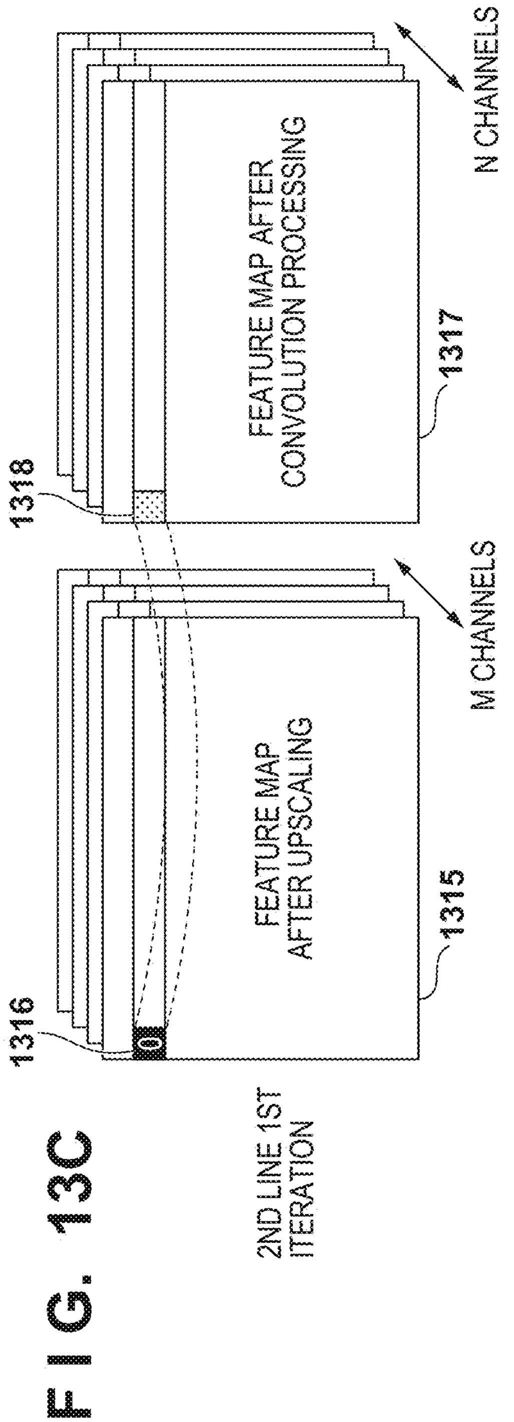
FIG. 13C illustrates an example of upscaling processing and convolution processing (filter size=1×1; upscaling ratio R=2; first iteration for line 2) in the second embodiment.

As illustrated in FIG. 13C, in the first iteration of processing for line 2 in the output feature map, the feature-data upscaling unit 405 inserts 1 pixel of feature data having a zero value and thereby generates 1×1 pixel of feature data 1316 in the upscaled feature map 1315. The number of pixels of feature data that are read differs from that in the first iteration of processing for line 1. The convolution processing unit 406 locally calculates the convolution processing result 1318 in the feature map 1317 after convolution processing using the 1×1 pixel of feature data in the upscaled feature map 1315 and a filter weight.

Figure 13D:
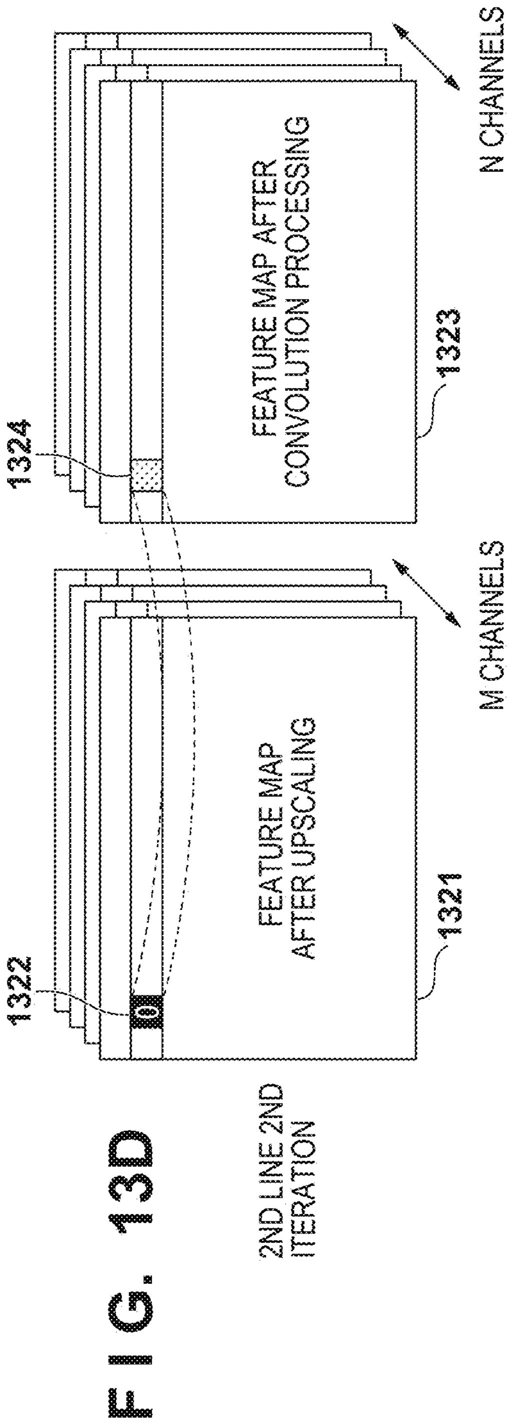
FIG. 13D illustrates an example of upscaling processing and convolution processing (filter size=1×1; upscaling ratio R=2; second iteration for line 2) in the second embodiment.

As illustrated in FIG. 13D, in the second iteration of processing for line 2 in the output feature map, the feature-data upscaling unit 405 inserts 1 pixel of feature data having a zero value and thereby generates 1×1 pixel of feature data 1322 in the upscaled feature map 1321. The number of pixels of feature data that are read differs from that in the first iteration of processing for line 1. The convolution processing unit 406 locally calculates the convolution processing result 1324 in the feature map 1323 after convolution processing using the 1×1 pixel of feature data in the upscaled feature map 1321 and a filter weight.

In the third and subsequent iterations of processing for line 2 in the output feature map, the read pattern in the first or second iteration is used, and thus detailed description thereof is omitted.

There is one type of read pattern in total, and 1 pixel of feature data 1302 is read.

Because a read pattern is generated and upscaling processing is performed in accordance with the 1×1 filter size in the present embodiment, the amount of feature data that is read is less than that in the first embodiment. Processing time and power consumption can thus be reduced.

Additional Embodiments

<Feature-Map Upscaling Ratio>

In the first and second embodiments, examples are described in which the feature-map upscaling ratio R is 1 or 2; however, the upscaling ratio R is not limited to 1 or 2, and may be any appropriate positive integer. Furthermore, in the second embodiment, an example is described in which there are two feature-data reading units; however, the number of feature-data reading units is not limited to two, and the number of feature-data reading units may be the same as the number of feature-map upscaling ratios R that can be set, or may be any appropriate number.

<Upscaling Processing: Nearest-Neighbor Interpolation>

Figure 9:
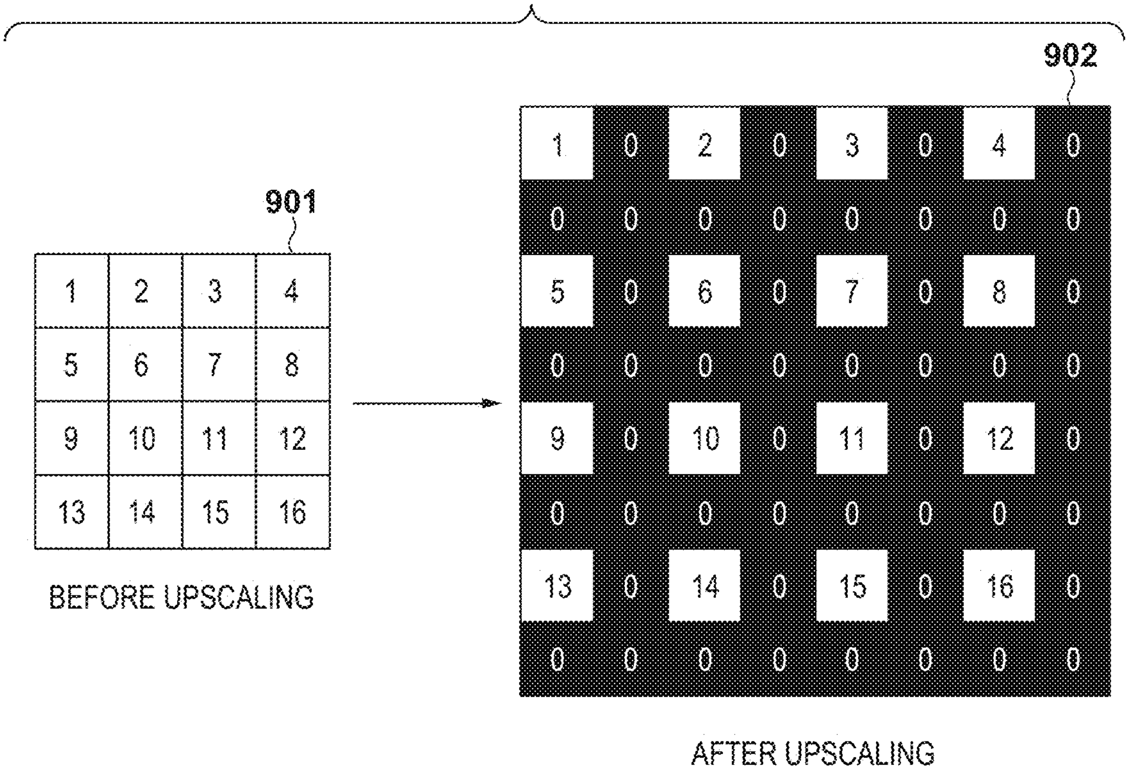
FIG. 9 is a diagram illustrating upscaling processing in deconvolution processing in the first embodiment.
Figure 10:
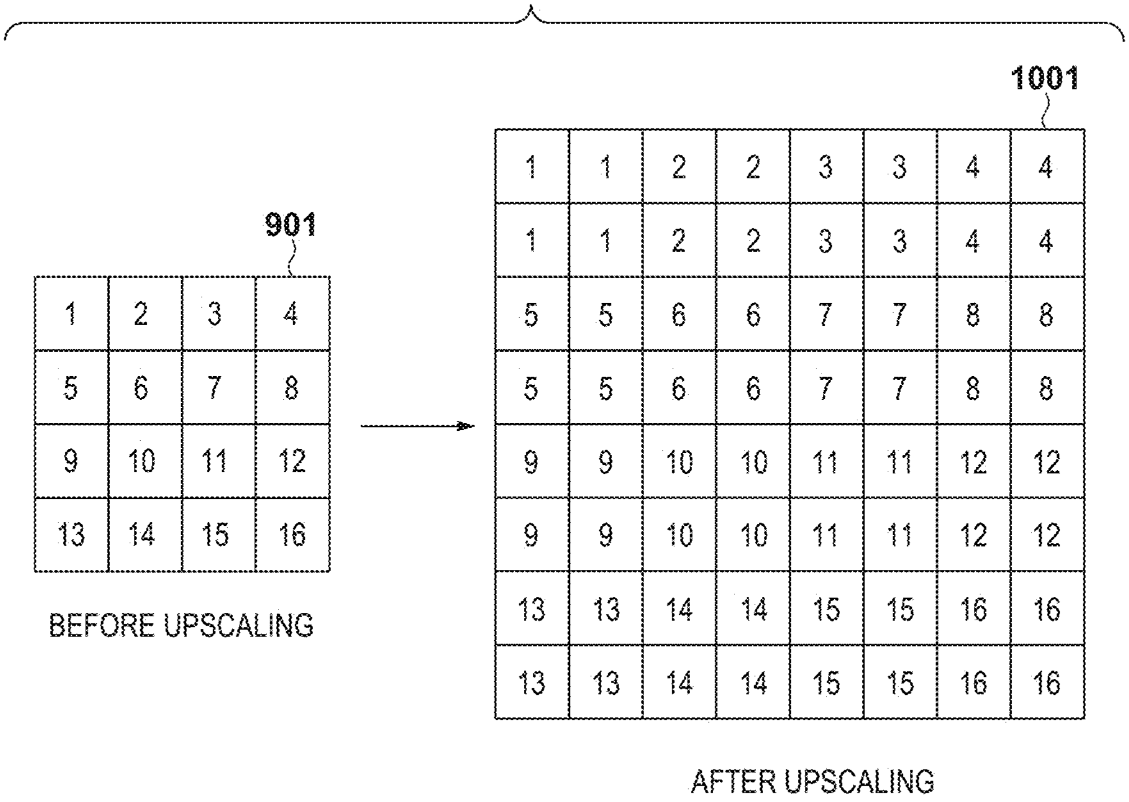
FIG. 10 is a diagram illustrating nearest-neighbor interpolation in another embodiment.

In the first and second embodiments, examples are described in which the feature-data upscaling unit 405 upscales feature maps by outputting zero values as illustrated in FIG. 9. The operation is also called bed-of-nails upsampling, where the input pixel is outputted to the upper-left corner of the corresponding 2×2 region of the upscaled feature maps. The position of the outputted pixel is not limited to the upper-left corner. It may be any of the 4 corners (the upper-left corner, the upper-right corner, the lower-left corner, or the lower-right corner) of the corresponding 2×2 region of the upscaled feature maps. However, if feature maps are upscaled by outputting zero values, the zero values may be discontinuous with values of adjacent pixels, and the accuracy of recognition processing may decrease. In order to improve the accuracy of recognition by CNN, feature maps may be upscaled by copying feature data to adjacent pixels as illustrated in FIG. 10. The upscaled feature data would be the same as the output of nearest-neighbor interpolation commonly used for upsampling. The numbers provided to the feature data 901 before upscaling and the upscaled feature data 1001 are feature-data indices. Among the upscaled feature data, pixels of feature data having the same index have the same value. In a case in which the feature-map upscaling ratio is R, an upscaled feature map I' and a feature map I before upscaling can be represented using the following formula.

[Math. 5]

$$I'_{i,j}(m) = I_{\left\lfloor \frac{i}{R} \right\rfloor, \left\lfloor \frac{j}{R} \right\rfloor}(m) \quad \text{(Formula 4)}$$

The variables i and j indicate coordinates of upscaled feature data.

In the configuration of the CNN processing unit 305 in the first and second embodiments, the same convolution processing unit 406 is used even if the upscaling ratio R varies; thus, multiple types of upscaling processing can be realized by changing the processing by the generating unit 409 and the feature-data reading unit 403.

Processing differing from the first embodiment will be described. FIGS. 14A to 14D illustrate an example of upscaling processing and convolution processing. The feature-map upscaling ratio R is 2, and the filter size is 3×3. Upscaling processing is divided into multiple iterations.

Figure 14A:
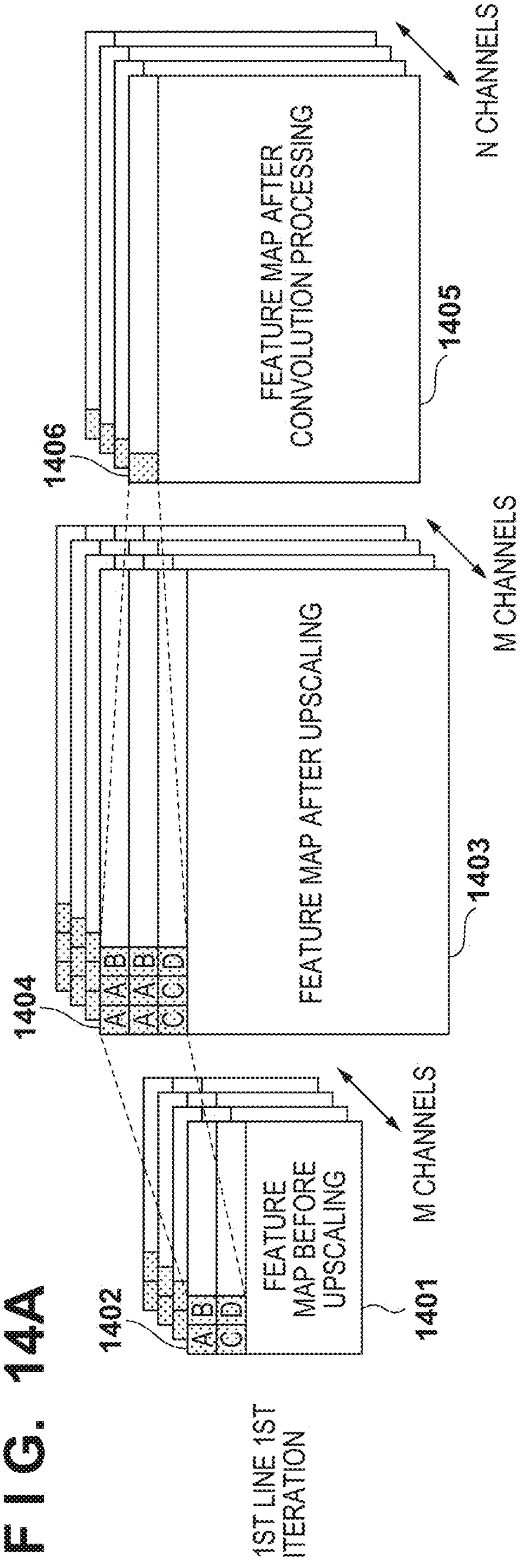
FIG. 14A illustrates an example of upscaling processing and convolution processing (filter size=3×3; upscaling ratio R=2; first iteration for line 1) in another embodiment.

As illustrated in FIG. 14A, in the first iteration of processing for line 1 in the output feature map, the feature-data reading unit 403 reads 4 pixels of feature data 1402 based on a read pattern from the feature map 1401 before upscaling, and the feature-data upscaling unit 405 copies some of the read pixels of feature data and thereby generates 3×3 pixels of feature data 1404 after upscaling. The convolution processing unit 406 locally calculates the convolution processing result 1406 using the 3×3 pixels of feature data and filter weights.

Figure 14B:
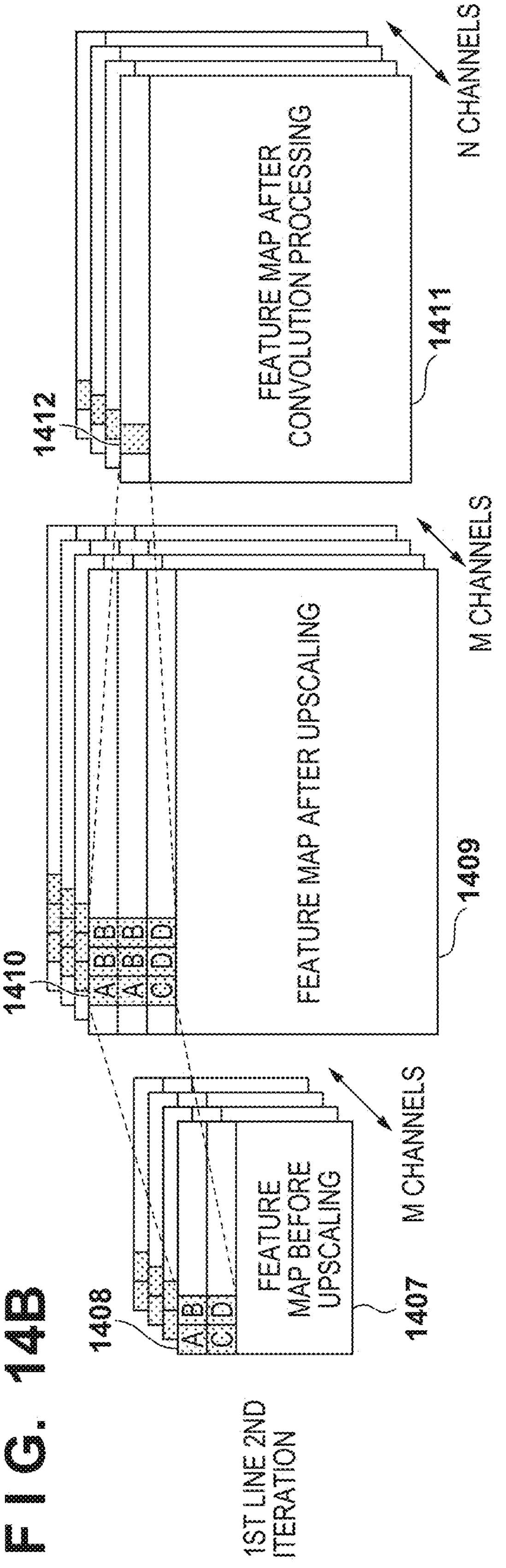
FIG. 14B illustrates an example of upscaling processing and convolution processing (filter size=3×3; upscaling ratio R=2; second iteration for line 1) in the other embodiment.

As illustrated in FIG. 14B, in the second iteration of processing for line 1 in the output feature map, the feature-data reading unit 403 reads 4 pixels of feature data 1408 based on the read pattern from the feature map 1407 before upscaling, and the feature-data upscaling unit 405 copies some of the read pixels of feature data and thereby generates 3×3 pixels of feature data 1410 after upscaling. The number of pixels of feature data that are read is the same as that in the first iteration of processing. The convolution processing unit 406 locally calculates the convolution processing result 1412 using the 3×3 pixels of feature data and filter weights.

In the third and subsequent iterations of processing for line 1 in the output feature map, the read pattern in the first or second iteration is used, and thus detailed description thereof is omitted.

Figure 14C:
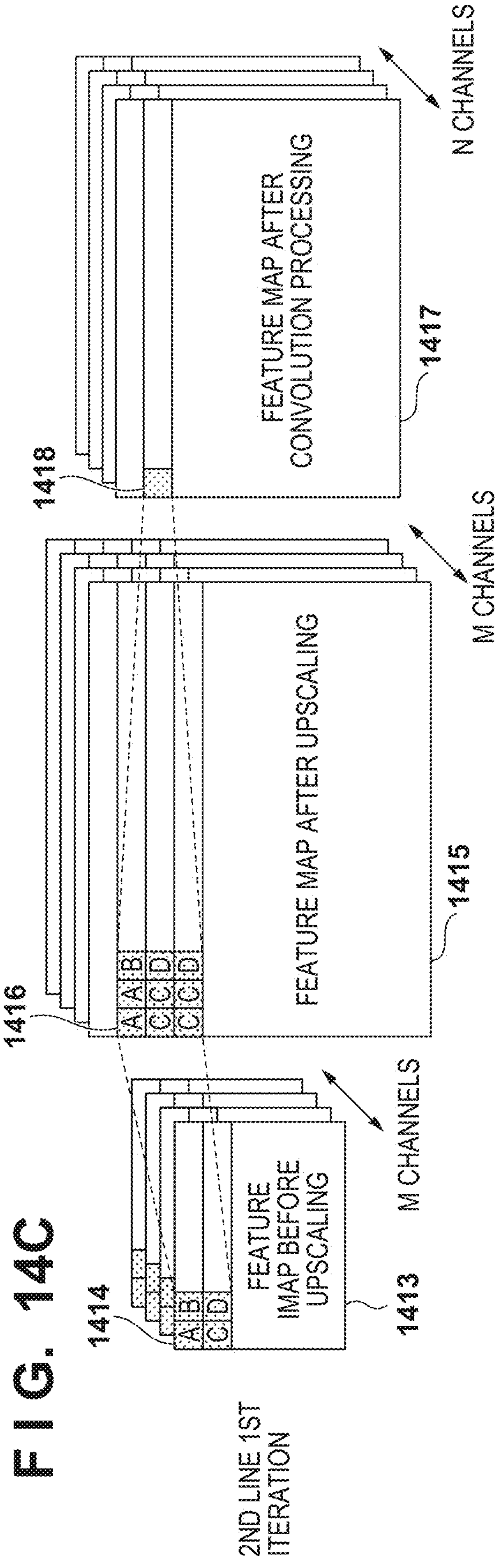
FIG. 14C illustrates an example of upscaling processing and convolution processing (filter size=3×3; upscaling ratio R=2; first iteration for line 2) in the other embodiment.

As illustrated in FIG. 14C, in the first iteration of processing for line 2 in the output feature map, the feature-data reading unit 403 reads 4 pixels of feature data 1414 based on the read pattern from the feature map 1413 before upscaling, and the feature-data upscaling unit 405 copies some of the read pixels of feature data and thereby generates 3×3 pixels of feature data 1416 after upscaling. The convolution processing unit 406 locally calculates the convolution processing result 1418 using the 3×3 pixels of feature data and filter weights.

Figure 14D:
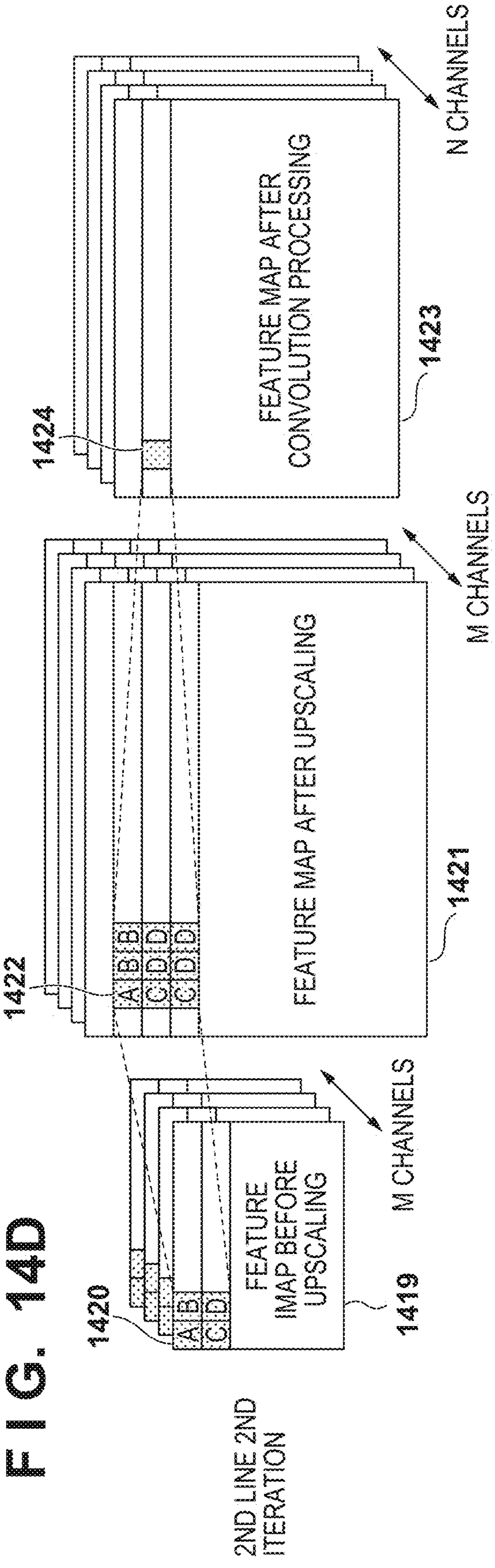
FIG. 14D illustrates an example of upscaling processing and convolution processing (filter size=3×3; upscaling ratio R=2; second iteration for line 2) in the other embodiment.

As illustrated in FIG. 14D, in the second iteration of processing for line 2 in the output feature map, the feature-data reading unit 403 reads 4 pixels of feature data 1420 based on the read pattern from the feature map 1419 before upscaling, and the feature-data upscaling unit 405 copies some of the read pixels of feature data and thereby generates 3×3 pixels of feature data 1422 after upscaling. The number of pixels of feature data that are read is the same as that in the first iteration of processing. The convolution processing unit 406 locally calculates the convolution processing result 1424 using the 3×3 pixels of feature data and filter weights.

In the third and subsequent iterations of processing for line 2 in the output feature map, the read pattern in the first or second iteration is used, and thus detailed description thereof is omitted.

There is one type of read pattern in total, and 4 pixels of feature data (1402, 1408, 1414, 1420) are read.

Because a feature map is upscaled by copying feature data in the present embodiment, there is one type of read pattern in total. Differing from the four types of read patterns in the first embodiment, 4 pixels of feature data need to be read each time to improve recognition accuracy.

<Upscaling Processing: Other Interpolation Methods>

Figure 11:
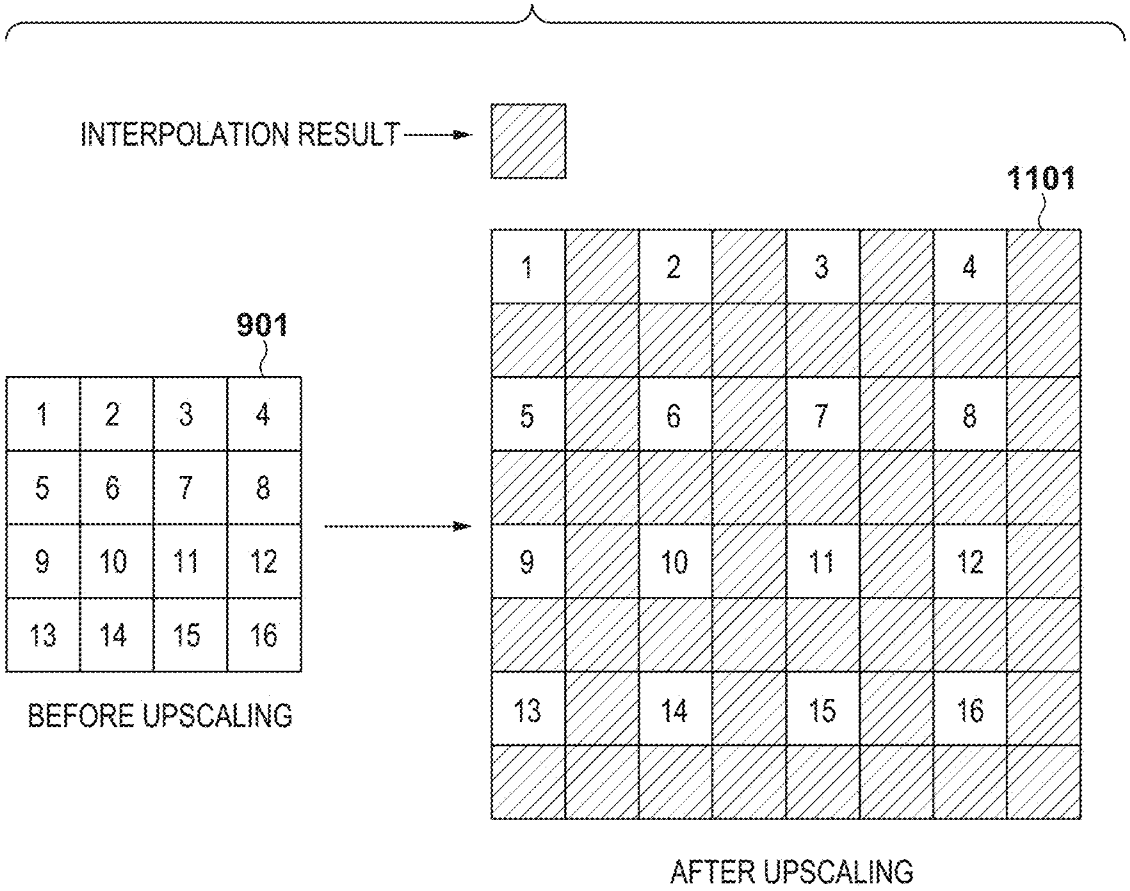
FIG. 11 is a diagram illustrating an interpolation method in another embodiment.

While an example in which feature data is copied as illustrated in FIG. 10 has been described, values copied from different pixels of feature data may be discontinuous with values of adjacent pixels, and the result of recognition processing may be adversely affected. In order to improve the accuracy of recognition by CNN, feature maps may be upscaled by performing interpolation processing other than nearest-neighbor interpolation based on feature data before upscaling as illustrated in FIG. 11. The numbers provided to the feature data 901 before upscaling and the upscaled feature data 1101 are feature-data indices. The hatched patterns indicate interpolated feature data. In a case in which the feature-map upscaling ratio R is 2, and bilinear interpolation is used, an upscaled feature map I' and a feature map I before upscaling can be represented using Formula 5.

[Math. 6]

(Formula 5)

$$I'_{i,j}(m) = \begin{cases} I_{\lfloor \frac{i}{2} \rfloor, \lfloor \frac{j}{2} \rfloor}(m), & \text{if} \cdot \lfloor \frac{i}{2} \rfloor \times 2 = i,\ \lfloor \frac{j}{2} \rfloor \times 2 = j \\ \frac{I_{\lfloor \frac{i}{2} \rfloor, \lfloor \frac{j}{2} \rfloor}(m) + I_{\lfloor \frac{i}{2} \rfloor + 1, \lfloor \frac{j}{2} \rfloor}(m)}{2}, & \text{if} \cdot \lfloor \frac{i}{2} \rfloor \times 2 \neq i,\ \lfloor \frac{j}{2} \rfloor \times 2 = j \\ \frac{I_{\lfloor \frac{i}{2} \rfloor, \lfloor \frac{j}{2} \rfloor}(m) + I_{\lfloor \frac{i}{2} \rfloor, \lfloor \frac{j}{2} \rfloor + 1}(m)}{2}, & \text{if} \cdot \lfloor \frac{i}{2} \rfloor \times 2 = i,\ \lfloor \frac{j}{2} \rfloor \times 2 \neq j \\ \frac{I_{\lfloor \frac{i}{2} \rfloor, \lfloor \frac{j}{2} \rfloor}(m) + I_{\lfloor \frac{i}{2} \rfloor + 1, \lfloor \frac{j}{2} \rfloor}(m) + I_{\lfloor \frac{i}{2} \rfloor, \lfloor \frac{j}{2} \rfloor + 1}(m) + I_{\lfloor \frac{i}{2} \rfloor + 1, \lfloor \frac{j}{2} \rfloor + 1}(m)}{4}, & \text{otherwise} \end{cases}$$

The variables i and j indicate coordinates of upscaled feature data.

Furthermore, in a case in which bilinear interpolation is used, the upscaled feature map I' and the feature map I before expansion can also be represented using Formula 6. Differing from FIG. 11, all pixels of upscaled feature data may be obtained by calculation.

[Math. 7]

(Formula 6)

$$I'_{i,j}(m) = \begin{cases} \frac{I_{\lfloor \frac{i}{2} \rfloor - 1, \lfloor \frac{j}{2} \rfloor - 1}(m) + 3 \times I_{\lfloor \frac{i}{2} \rfloor, \lfloor \frac{j}{2} \rfloor - 1}(m) + 3 \times I_{\lfloor \frac{i}{2} \rfloor - 1, \lfloor \frac{j}{2} \rfloor}(m) + 9 \times I_{\lfloor \frac{i}{2} \rfloor, \lfloor \frac{j}{2} \rfloor}(m)}{16}, & \text{if} \cdot \lfloor \frac{i}{2} \rfloor \times 2 = i,\ \lfloor \frac{j}{2} \rfloor \times 2 = j \\ \frac{3 \times I_{\lfloor \frac{i}{2} \rfloor, \lfloor \frac{j}{2} \rfloor - 1}(m) + I_{\lfloor \frac{i}{2} \rfloor + 1, \lfloor \frac{j}{2} \rfloor - 1}(m) + 9 \times I_{\lfloor \frac{i}{2} \rfloor, \lfloor \frac{j}{2} \rfloor}(m) + 3 \times I_{\lfloor \frac{i}{2} \rfloor + 1, \lfloor \frac{j}{2} \rfloor}(m)}{16}, & \text{if} \cdot \lfloor \frac{i}{2} \rfloor \times 2 \neq i,\ \lfloor \frac{j}{2} \rfloor \times 2 = j \\ \frac{3 \times I_{\lfloor \frac{i}{2} \rfloor - 1, \lfloor \frac{j}{2} \rfloor}(m) + 9 \times I_{\lfloor \frac{i}{2} \rfloor, \lfloor \frac{j}{2} \rfloor}(m) + I_{\lfloor \frac{i}{2} \rfloor - 1, \lfloor \frac{j}{2} \rfloor + 1}(m) + 3 \times I_{\lfloor \frac{i}{2} \rfloor, \lfloor \frac{j}{2} \rfloor + 1}(m)}{16}, & \text{if} \cdot \lfloor \frac{i}{2} \rfloor \times 2 = i,\ \lfloor \frac{j}{2} \rfloor \times 2 \neq j \\ \frac{9 \times I_{\lfloor \frac{i}{2} \rfloor, \lfloor \frac{j}{2} \rfloor}(m) + 3 \times I_{\lfloor \frac{i}{2} \rfloor + 1, \lfloor \frac{j}{2} \rfloor}(m) + 3 \times I_{\lfloor \frac{i}{2} \rfloor, \lfloor \frac{j}{2} \rfloor + 1}(m) + I_{\lfloor \frac{i}{2} \rfloor + 1, \lfloor \frac{j}{2} \rfloor + 1}(m)}{16}, & \text{otherwise} \end{cases}$$

The variables i and j indicate coordinates of upscaled feature data.

Because it is necessary to calculate an interpolation result using multiple pixels of feature data, more pixels of feature data need to be read compared to nearest-neighbor interpolation, and read patterns differ from those for nearest-neighbor interpolation.

There is no limitation to bilinear interpolation, and any appropriate interpolation algorithm may be used, including bicubic interpolation, etc., commonly used for upsampling.

<Upscaling Processing: Pixel Shuffle>

Figure 12:
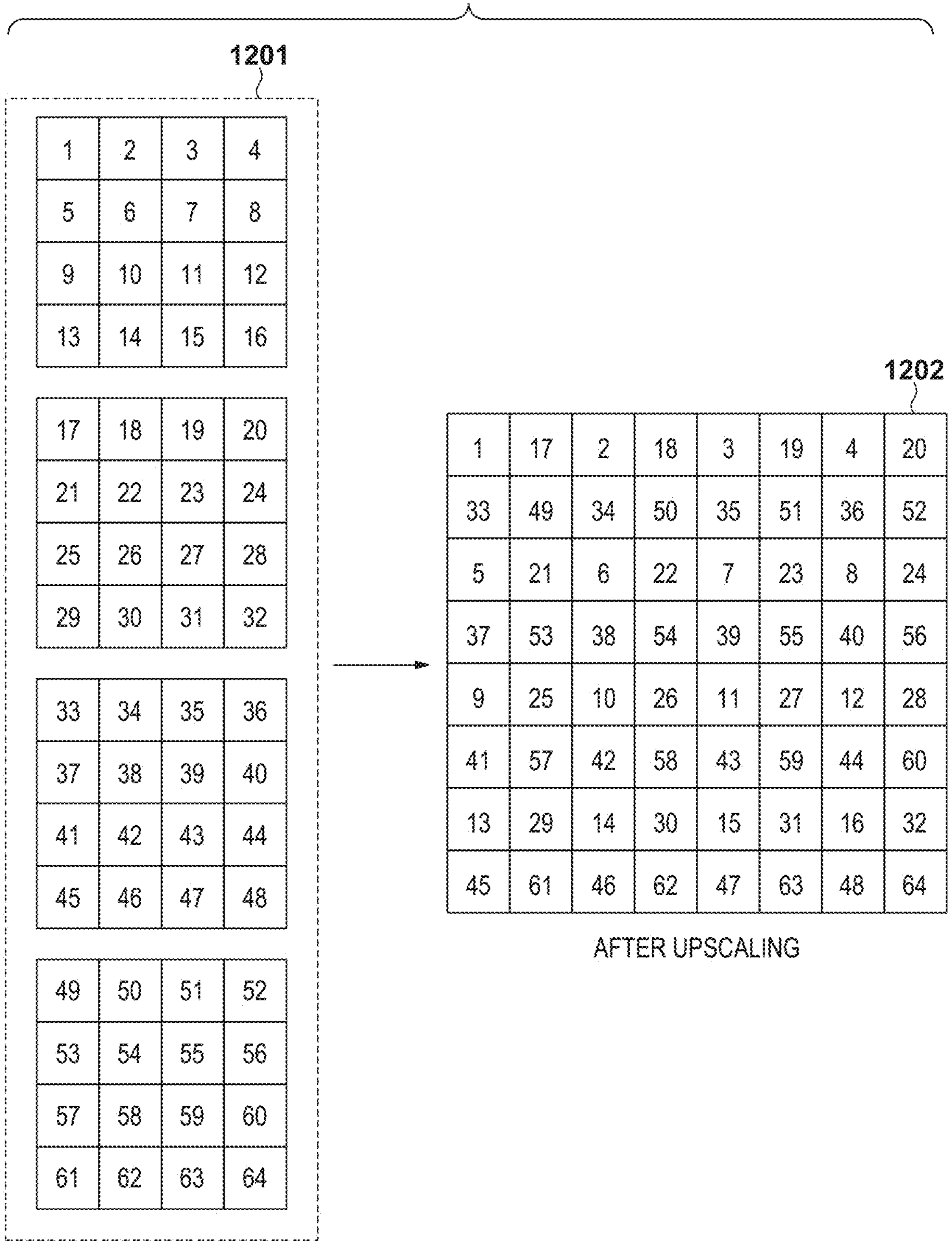
FIG. 12 is a diagram illustrating Pixel Shuffle in another embodiment.

In the first and second embodiments, examples described in which the feature-data upscaling unit 405 upscales feature maps by outputting zero values as illustrated in FIG. 9; however, in order to improve the accuracy of recognition by CNN, feature maps may be upscaled by rearranging feature data in four feature maps using the Pixel Shuffle method as illustrated in FIG. 12. The numbers provided to the feature data 1201 before upscaling and the upscaled feature data 1202 are feature-data indices.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2023-145572, filed Sep. 7, 2023, which is hereby incorporated by reference herein in its entirety.

What is claimed is:

1. An information processing apparatus that processes feature data in a plurality of feature maps in accordance with a network structure including a plurality of layers, the information processing apparatus comprising:

at least one processor;

a data holding memory configured to hold feature data; and at least one memory storing a program which, when executed by the at least one processor, cause the information processing apparatus to perform:

first reading processing configured to read the feature data based on a read pattern;

upscaling processing configured to upscale the read feature data; and convolution processing configured to perform convolution on the feature data upscaled by the upscaling processing, wherein the upscaling processing and the convolution processing execute upscaling and convolution on the feature data in one feature map, and then execute upscaling and convolution on the feature data in the next feature map.

2. The information processing apparatus according to claim 1, wherein the upscaling processing sequentially upscales subsets of the feature data in the feature map, and the convolution processing executes the convolution on the upscaled subsets of the feature data.

3. The information processing apparatus according to claim 1, wherein the data holding memory holds an upscaling ratio, and the upscaling processing upscales the feature data in accordance with the upscaling ratio read from the data holding memory, and outputs the upscaled feature data to the convolution processing.

4. The information processing apparatus according to claim 1, wherein the program, when executed by the at least one processor, further cause the information processing apparatus to perform:

second reading processing configured to read the feature data based on a read pattern that is different from the read pattern of the first reading processing; and selecting processing configured to select either the feature data upscaled by the upscaling processing or the feature data read by the second reading processing, wherein the convolution processing executes the convolution on the selected feature data.

5. The information processing apparatus according to claim 1, wherein the program, when executed by the at least one processor, further cause the information processing apparatus to perform:

generating processing configured to generate the read pattern based on information about the network structure.

6. The information processing apparatus according to claim 1, wherein the program, when executed by the at least one processor, further cause the information processing apparatus to perform:

generating processing configured to generate the read pattern in accordance with the number of pixels of the feature data inputted to the convolution processing.

7. The information processing apparatus according to claim 6, wherein the number of pixels of the feature data inputted to the convolution processing and the number of read patterns generated by the generating processing vary depending on a filter size of the convolution in each of the plurality of layers.

8. The information processing apparatus according to claim 1, wherein the number of pixels of the feature data read by the first reading processing varies depending on the read pattern.

9. The information processing apparatus according to claim 3, wherein the number of pixels of the feature data read by the first reading processing varies depending on the upscaling ratio in each of the plurality of layers.

10. The information processing apparatus according to claim 5, wherein the number of read patterns generated by the generating processing varies depending on an upscaling ratio of feature data in each of the plurality of layers.

11. The information processing apparatus according to claim 1, wherein the upscaling processing upscales the feature data using a zero value.

12. The information processing apparatus according to claim 1, wherein the upscaling processing upscales the feature data by copying the feature data to the adjacent feature data.

13. The information processing apparatus according to claim 1, wherein the upscaling processing upscales the feature data by interpolation processing in which the feature data is used.

14. The information processing apparatus according to claim 4, wherein, for a same filter size, the number of pixels of the feature data read by the first reading processing is less than the number of pixels of the feature data read by the second reading processing.

15. A processing method for an information processing apparatus that processes feature data in a plurality of feature maps in accordance with a network structure including a plurality of layers, the processing method comprising:

holding feature data;

reading the feature data based on a read pattern;

upscaling the read feature data; and performing convolution processing on the feature data upscaled by the upscaling, wherein, in the upscaling of the feature data and the convolution processing, upscaling and convolution processing are executed on the feature data in one feature map, and then upscaling and convolution processing are executed on the feature data in the next feature map.

16. A non-transitory computer-readable storage medium storing a computer program that, by being read and executed by a computer that processes feature data in a plurality of feature maps in accordance with a network structure including a plurality of layers, causes the computer to:

hold feature data;

read the feature data based on a read pattern;

upscale the read feature data; and perform convolution processing on the feature data upscaled by the upscaling, wherein, in the upscaling of the feature data and the convolution processing, the computer is caused to execute upscaling and convolution processing on the feature data in one feature map, and then execute upscaling and convolution processing on the feature data in the next feature map.

* * * * *